(12) United States Patent
Kim

(10) Patent No.: US 10,455,066 B2
(45) Date of Patent: *Oct. 22, 2019

(54) MOBILE SYSTEM WITH WIRELESS EARBUD

(71) Applicant: PINN, INC., Tustin, CA (US)

(72) Inventor: Seung Jin Kim, Irvine, CA (US)

(73) Assignee: PINN, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/563,937

(22) PCT Filed: Apr. 4, 2016

(86) PCT No.: PCT/US2016/025936
§ 371 (c)(1),
(2) Date: Oct. 2, 2017

(87) PCT Pub. No.: WO2016/161454
PCT Pub. Date: Oct. 6, 2016

(65) Prior Publication Data
US 2018/0131793 A1  May 10, 2018

Related U.S. Application Data

(60) Provisional application No. 62/142,978, filed on Apr. 3, 2015, provisional application No. 62/199,943, filed on Jul. 31, 2015.

(51) Int. Cl.
*H04M 1/05* (2006.01)
*H04M 1/60* (2006.01)
(Continued)

(52) U.S. Cl.
CPC ........... *H04M 1/05* (2013.01); *H04M 1/6066* (2013.01); *H04M 1/7253* (2013.01); *H04R 1/1016* (2013.01); *H04R 2420/07* (2013.01)

(58) Field of Classification Search
CPC .... H04M 1/6066; H04M 1/05; H04M 1/7253; H04R 1/1041; H04R 1/1016; H04R 1/1025; H04R 1/1091; H04R 2420/07
See application file for complete search history.

(56) References Cited

U.S. PATENT DOCUMENTS

| 5,881,149 A | 3/1999 | Weatherill |
| 6,424,820 B1 | 7/2002 | Burdick et al. |

(Continued)

FOREIGN PATENT DOCUMENTS

| CN | 2489520 Y | 5/2001 |
| CN | 2783637 Y | 5/2006 |

(Continued)

OTHER PUBLICATIONS

International Search Report and Written Opinion dated Jul. 11, 2016 for PCT/US16/25936 which is the parent application—10 pages.

(Continued)

*Primary Examiner* — David L Ton
(74) *Attorney, Agent, or Firm* — Knobbe Martens Olson & Bear LLP

(57) ABSTRACT

The disclosure herein provides a personal wireless media station including a base station and a wireless earbud. The personal wireless media station may detect that the wireless earbud is docked to the base station, play sound through a speaker of the base station while the wireless earbud is docked to the base station, detect that the wireless earbud is undocked from the base station, cease to play sound through the speaker of the base station in response to detecting that the wireless earbud is undocked from the base station, and cause sound to begin playing through the wireless earbud while the wireless earbud is undocked from the base station.

38 Claims, 20 Drawing Sheets

(51) Int. Cl.
*H04M 1/725* (2006.01)
*H04R 1/10* (2006.01)

(56) References Cited

U.S. PATENT DOCUMENTS

| | | | |
|---|---|---|---|
| 6,473,630 | B1 | 10/2002 | Baranowski et al. |
| 6,765,789 | B2 | 7/2004 | Yang |
| 6,768,911 | B2 | 7/2004 | Hino et al. |
| 7,149,552 | B2 | 12/2006 | Lair |
| 7,272,421 | B2 | 9/2007 | Bang et al. |
| 7,292,880 | B2 | 11/2007 | Lehtonen |
| 7,418,277 | B2 | 8/2008 | Tsai |
| D586,823 | S | 2/2009 | Anderson et al. |
| 7,548,040 | B2 | 6/2009 | Lee et al. |
| D600,013 | S | 9/2009 | McCune |
| 7,590,233 | B2 | 9/2009 | Chiloyan |
| 7,643,283 | B2 | 1/2010 | Jubelirer et al. |
| 7,738,247 | B2 | 6/2010 | Choi |
| 7,778,601 | B2 | 8/2010 | Seshadri et al. |
| 7,869,195 | B1 | 1/2011 | Patton |
| 7,885,645 | B2 | 2/2011 | Postma et al. |
| 8,116,832 | B2 | 2/2012 | Wang et al. |
| 8,121,329 | B2 | 2/2012 | Groset et al. |
| 8,204,435 | B2 | 6/2012 | Seshadri et al. |
| 8,213,666 | B2 | 7/2012 | Groesch |
| 8,238,967 | B1 | 8/2012 | Arnold et al. |
| D667,390 | S | 9/2012 | Matera |
| 8,384,527 | B2 | 2/2013 | Irwin |
| 8,582,755 | B2 | 11/2013 | Bradford et al. |
| 8,867,748 | B2 | 10/2014 | Posa |
| 9,002,420 | B2 | 4/2015 | Pattikonda et al. |
| D728,624 | S | 5/2015 | Akana et al. |
| 9,170,612 | B2 | 10/2015 | Farjami |
| 9,319,766 | B2 | 4/2016 | Weinstein et al. |
| 9,344,793 | B2 | 5/2016 | Selig et al. |
| 9,760,115 | B2 | 9/2017 | Farjami |
| 9,807,491 | B2 * | 10/2017 | Kim ............... H04M 1/05 |
| 2003/0119565 | A1 | 6/2003 | Lin |
| 2003/0224726 | A1 | 12/2003 | Shearer et al. |
| 2005/0008147 | A1 | 1/2005 | Lee |
| 2005/0026560 | A1 | 2/2005 | Villaverde et al. |
| 2005/0107120 | A1 | 5/2005 | Yueh |
| 2005/0186905 | A1 | 8/2005 | Tracy et al. |
| 2006/0062400 | A1 | 3/2006 | Chia-Chun |
| 2006/0111044 | A1 | 5/2006 | Keller |
| 2006/0135218 | A1 | 6/2006 | Son et al. |
| 2006/0166715 | A1 | 7/2006 | Van Engelen et al. |
| 2006/0046656 | A1 | 10/2006 | Yang |
| 2006/0262949 | A1 | 11/2006 | Cho et al. |
| 2007/0026908 | A1 | 2/2007 | Chen |
| 2007/0147629 | A1 | 6/2007 | Chiloyan |
| 2007/0254695 | A1 | 11/2007 | Langberg et al. |
| 2008/0070516 | A1 | 3/2008 | Lee et al. |
| 2008/0108306 | A1 | 5/2008 | Yee |
| 2009/0046869 | A1 | 2/2009 | Griffin, Jr. et al. |
| 2010/0245585 | A1 | 9/2010 | Fisher et al. |
| 2010/0312944 | A1 | 12/2010 | Walker |
| 2010/0320961 | A1 * | 12/2010 | Castillo ............ H02J 7/0044 320/107 |
| 2011/0141357 | A1 | 6/2011 | Price et al. |
| 2011/0148352 | A1 | 6/2011 | Wang et al. |
| 2011/0206217 | A1 | 8/2011 | Weis |
| 2011/0244927 | A1 | 10/2011 | Kari |
| 2012/0140963 | A1 | 6/2012 | Larsen et al. |
| 2013/0065637 | A1 | 3/2013 | Tasker |
| 2013/0094687 | A1 | 4/2013 | Weinstein et al. |
| 2013/0206612 | A1 | 8/2013 | Chun |
| 2013/0244633 | A1 | 9/2013 | Jacobs |
| 2013/0297844 | A1 | 11/2013 | Rosenberg et al. |
| 2014/0073256 | A1 | 3/2014 | Newham et al. |
| 2014/0116085 | A1 | 5/2014 | Lam |
| 2014/0273851 | A1 | 9/2014 | Donaldson et al. |
| 2014/0279122 | A1 | 9/2014 | Luna |
| 2014/0295758 | A1 | 10/2014 | Pedersen |
| 2015/0078557 | A1 | 3/2015 | Li |
| 2015/0078575 | A1 | 3/2015 | Selig et al. |
| 2015/0241922 | A1 | 8/2015 | Farjami |
| 2015/0245125 | A1 | 8/2015 | Shaffer |
| 2015/0245126 | A1 | 8/2015 | Shaffer |
| 2015/0326990 | A1 | 11/2015 | Yeh et al. |
| 2015/0373448 | A1 | 12/2015 | Shaffer |
| 2016/0004277 | A1 | 1/2016 | Farjami |
| 2016/0073189 | A1 | 3/2016 | Linden et al. |
| 2016/0360350 | A1 | 12/2016 | Watson et al. |
| 2017/0013342 | A1 | 1/2017 | Watson et al. |
| 2017/0272561 | A1 | 9/2017 | Kim et al. |

FOREIGN PATENT DOCUMENTS

| | | |
|---|---|---|
| CN | 201045758 Y | 4/2008 |
| CN | 201122956 Y | 9/2008 |
| CN | 201315619 Y | 9/2009 |
| CN | 203193717 U | 9/2013 |
| CN | 203720788 U | 12/2013 |
| CN | 103815628 B | 1/2014 |
| CN | 204090096 U | 1/2015 |
| JP | 2012100248 A | 5/2012 |
| WO | 2002/39600 A2 | 5/2002 |
| WO | 2003/098901 A1 | 11/2003 |
| WO | 2005/053289 A1 | 6/2005 |
| WO | 2005064813 A1 | 7/2005 |
| WO | 2008/033491 A2 | 3/2008 |
| WO | 2010/083829 A1 | 7/2010 |

OTHER PUBLICATIONS

International Preliminary Report on Patentability dated Jul. 17, 2016 for PCT/US16/25936 which is the parent application—8 pages.
Archived copy of website, http://mypinn.com in 4 pages. The website, http://mypinn.com, was first published on May 5, 2016 and archived on Jun. 26, 2016. Archived copy was downloaded from https://web.archive.org/web/20160626155438/http://mypinn.com/ on Apr. 13, 2017.
Website, http://mypinn.com/ in 5 pages. The copy was downloaded on Apr. 13, 2017.
Website, https://www.kickstarter.com/projects/906938906/pinn-all-in-one-earbud-mic-and-oled-display-for-sm?ref=discovery in 20 pages. The website was published on Aug. 10, 2016 and the copy was downloaded on Apr. 13, 2017.
Website, https://www.banggood.com/Separate-Design-Bluetooth-Handsfree-Headset-Sports-Watch-For-Phone-6-p-951983.html in 6 pages. The copy was downloaded on Jun. 15, 2017.
Website, https://www.banggood.com/Link Dream Separate Design Bluetooth Headset Sports Watch for iPhone 6-p-951983.html in 12 pages. The copy was downloaded on May 1, 2016.
Communication in cases for which no other form is applicable dated Aug. 15, 2017 in corresponding PCT application No. PCT/US2016/025936 in 12 pages.
"Jabra Mini User Manual"—18 pages (2013).
"Jabra Mini Bluetooth Headset", https://www.youtube.com/watch?v=BBxL9670eFY (Dec. 20, 2013).
"Earin—The Worlds Smallest Wireless Earbuds", Kickstarter <https://www.kickstarter.com/projects/earin/earin-the-worlds-smallest-wireless-earbuds?ref=email—15 pages (accessed Oct. 5, 2018).
BRAGI LLC, "The Dash—Wireless Smart in Ear Headphones", Kickstarter <https://www.kickstarter.com/projects/hellobragi/the-dash-wireless-smart-in-ear-headphones—29 pages (accessed Oct. 5, 2018).
"Voyager Legend UC: Wireless Headset System (B235 and B235-M)", Plantronics—18 pages.
Plantronics charging case unboxing (Video).
Bragi (company), <https:/en.wikipedia.org/wiki/Bragi_(company), in 9 pages (accessed on Mar. 9, 2019).
Bragi, The Dash PRO Quick Start Guide—15 pages (2015).

* cited by examiner

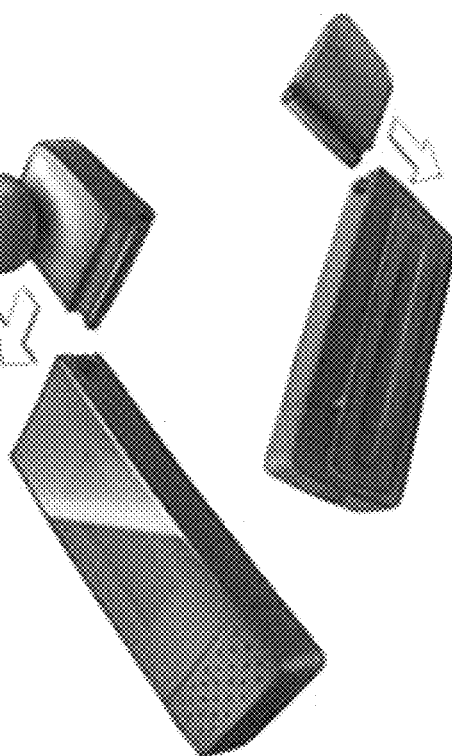
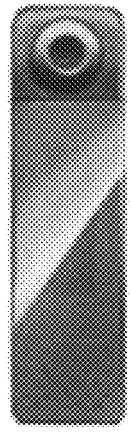
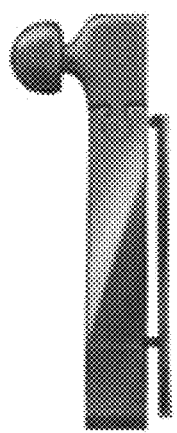

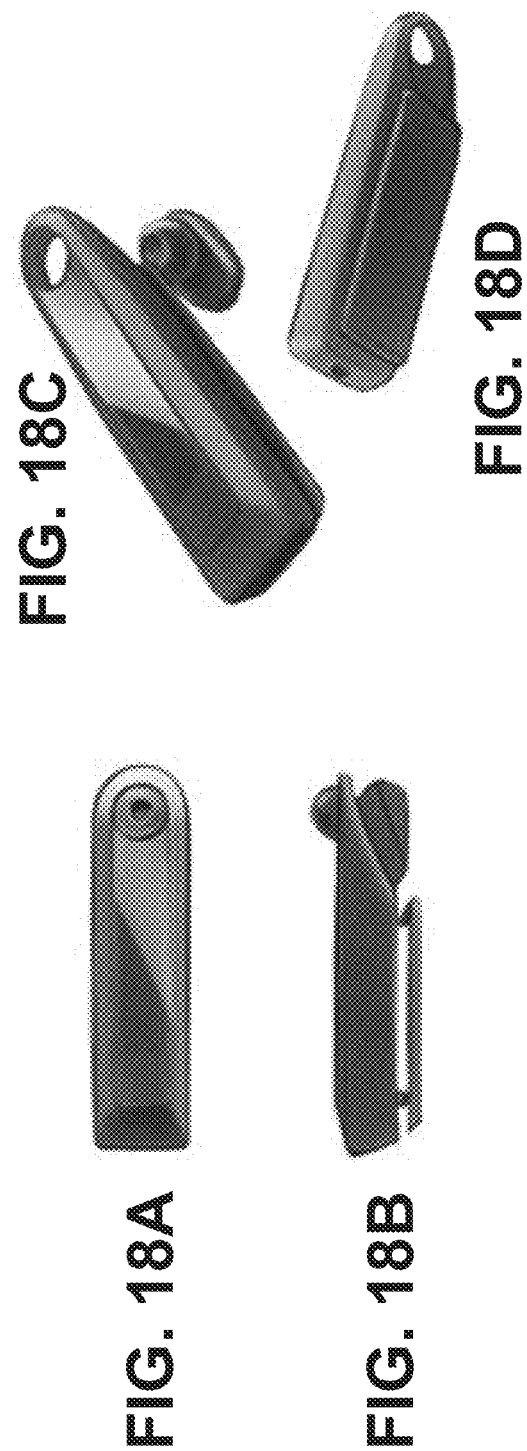

FIG. 20A
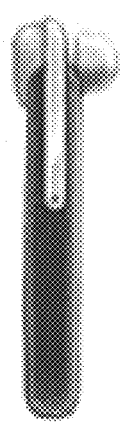
FIG. 20B
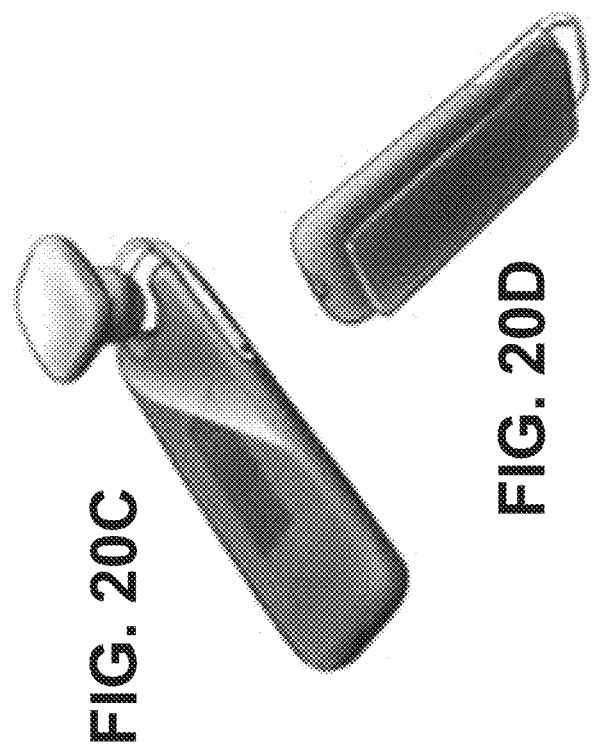
FIG. 20C
FIG. 20D

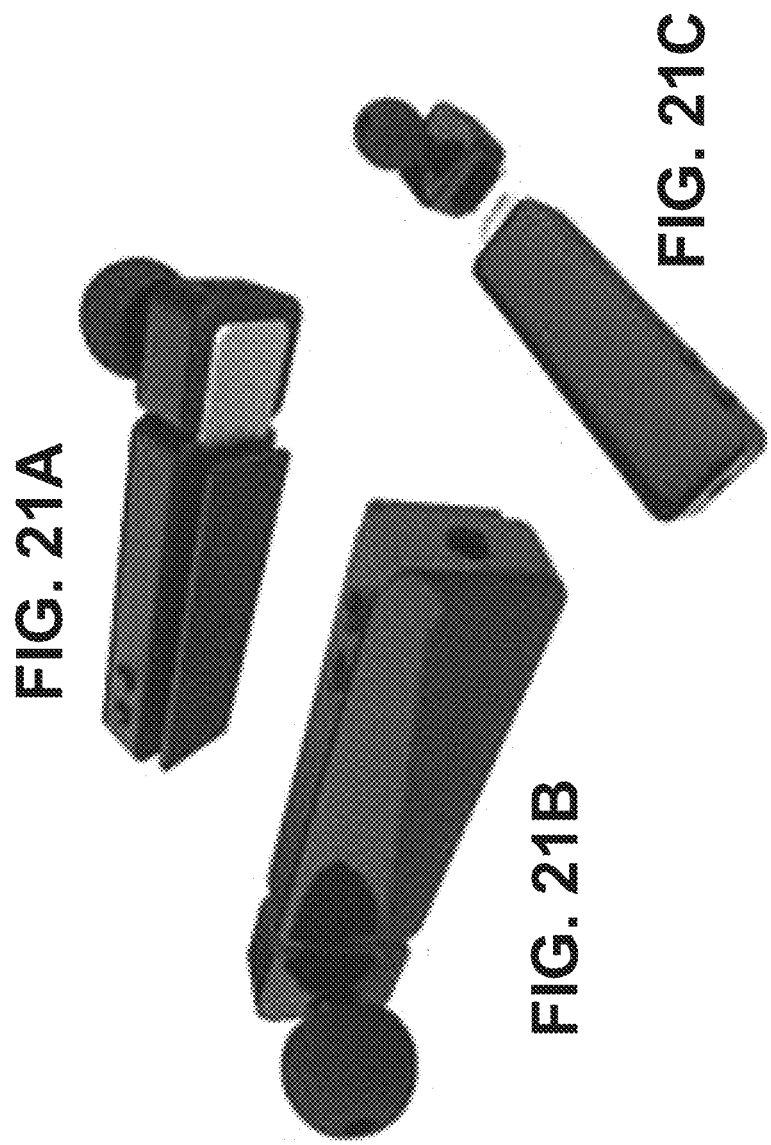

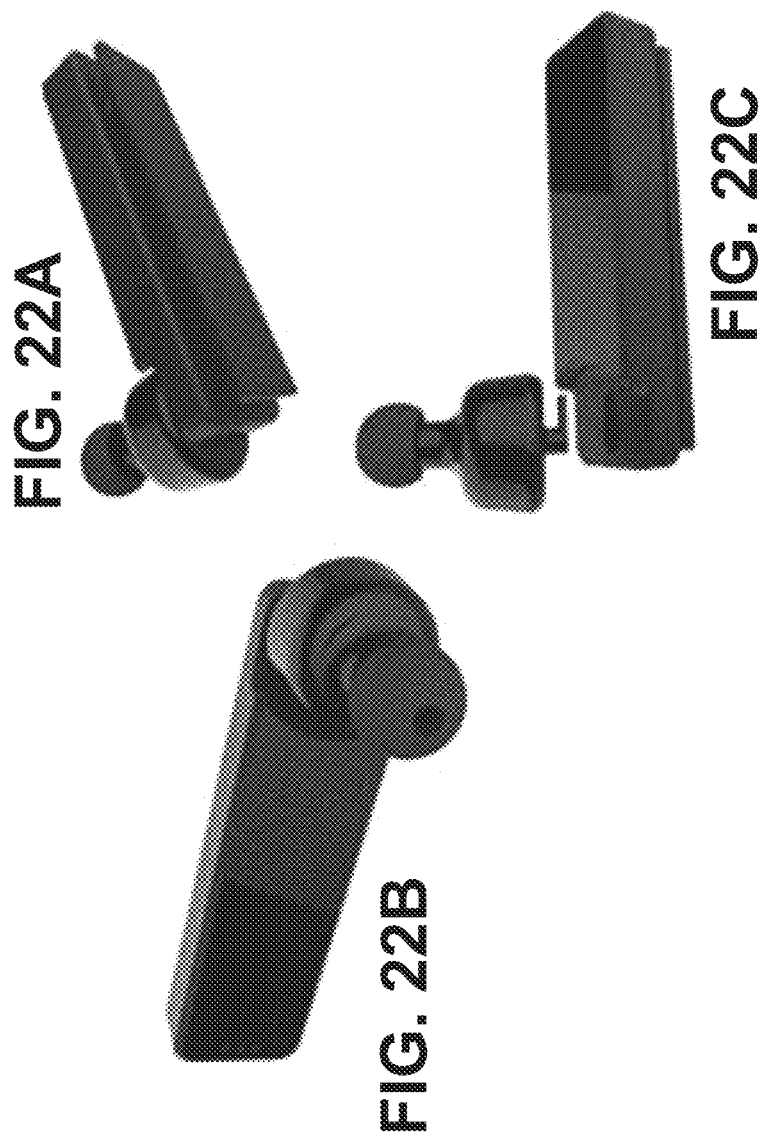

MOBILE SYSTEM WITH WIRELESS EARBUD

BACKGROUND

The present disclosure relates to mobile consumer electronic devices and, more particularly, to devices connected to smart phones and tablets for delivering sound and visual information to users. Today, mobile devices such as smart phones and tablet computers are often used in conjunction with mobile accessories that facilitate user access to the inputs and outputs (e.g., display, speaker, microphone, etc.) of the mobile devices. For example, if a user wishes to listen to music from his smart phone without disturbing those around him, he may plug a set of earphones into the smart phone and listen through the earphones. If the user wishes to type faster on his smart phone, he may connect a Bluetooth keyboard to the smart phone and type on the Bluetooth keyboard. Thus, using such mobile accessories can improve how users communicate with the mobile devices.

SUMMARY

One aspect of the invention provides a personal wireless media station in communication with a paired mobile computing device of a user for playing sound and displaying data based on communication with the paired mobile computing device. The personal wireless media station comprises: a base station comprising an information display, a base station speaker, a wireless module, a base station connector and a docking bay; a wireless earbud comprising an earbud speaker and a earbud connector, the wireless earbud comprising a body configured to dock to the docking bay or undock from the docking bay, wherein when the earbud is docked to the docking bay of the base station, the wireless earbud and the base station form a single integrated body and the earbud connector and the base station connector form electrical contact with each other; wherein the personal wireless media station is configured to play sound through the base station speaker when the wireless earbud is in a docked state in which the wireless earbud is docked to the docking bay, wherein the personal wireless media station is configured to play sound through the earbud speaker when the wireless earbud is in an undocked state in which the wireless earbud is undocked from the docking bay.

The personal wireless media station is programmed: to determines a docked-to-undocked change in which the wireless earbud becomes undocked from its docked state, upon determining the docked-to-undocked change, while sound is being played on the base station speaker, to cease playing sound on the base station speaker and to begin playing sound on the earbud speaker, to determines a undocked-to-docked change in which the wireless earbud becomes docked from its undocked state, upon determining the undocked-to-docked change, while sound is being played on the earbud speaker, to cease playing sound on the earbud speaker and to begin playing sound on the base station speaker.

In the foregoing personal wireless media station, the wireless earbud may comprise a head portion, a waist portion and an ear portion, the ear portion configured to be inserted into the user's ear to provide sound playback, wherein the earbud connector may be provided on the waist portion such that the earbud connector is in electrical contact with the base station connector when the wireless earbud is in the docking state. The base station may comprise two docking arms that extending generally parallel to each other with a gap therebetween, which provides the docking bay, wherein the base station may comprise at least one locking device on an inner surface of one of the two docking arms for engaging with the waist portion of the wireless earbud when the wireless earbud is in the docking state. The wireless earbud may comprise a recess formed into the waist portion, wherein the locking device of the base station may comprise a locking protrusion configured to spatially correspond to the recess when the wireless earbud is in its docked state, wherein the recess may be configured to receive the locking protrusion when the wireless earbud is in its docked state.

In some aspects, a personal wireless media station is in communication with a paired mobile computing device of a user for playing sound and displaying information based on communication with the paired mobile computing device. The personal wireless media station includes a base station, a wireless earbud, a first wireless module, and a second wireless module. The base station includes an information display, a speaker, the fire and second wireless modules, and a base station connector. The wireless earbud includes an earbud connector that is mateable with the base station connector. The wireless earbud and the base station form a single integrated body when the earbud connector and the base station connector are connected with each other. The first wireless module wirelessly communicates with a mobile computing device that has been paired with the personal wireless media station. The second wireless module wirelessly communicates with the wireless earbud.

In some aspects, the personal wireless media station plays sound through the speaker or causes the wireless earbud to play sound when the personal wireless media station receives audio data from the paired mobile computing device via the first wireless module. The personal wireless media station is programmed to detect when the earbud connector connects to the base station connector, play sound through the speaker of the base station while the earbud connector is connected to the base station connector, detect when the earbud connector disconnects from the base station connector, stop playing sound through the speaker when it is detected that the earbud connector is disconnected from the base station connector, and wirelessly send audio data to the earbud and cause to play sound through the earbud while the earbud connector is not connected to the base station connector.

In some aspects, the personal wireless media station is further programmed to stop wireless sending of audio data to the earbud when it is detected that the earbud connector has got connected to the base station connector, and start wireless sending of audio data to the earbud when it is detected that the earbud connector has got disconnected from the base station connector. In some aspects, the first wireless module performs two-way wireless data communication with the paired mobile computing device, the second wireless module performs one-way wireless data communication to send data to the wireless earbud, and the wireless earbud is not capable of wirelessly sending data to the personal wireless media station.

In some aspects, the wireless earbud is not capable of wirelessly sending data to the personal wireless media station, and the wireless earbud is capable of performing two-way wired data communication with the personal wireless media station when the earbud connector is connected to the base station connector. In some aspects, the personal wireless media station plays sound only as it receives from the paired mobile computing device audio data for the sound to play. In some aspects, the personal wireless media station does not include a digital storage device for storing a library of audio contents that are not being played through either the speaker or the earbud. In some aspects, the personal wireless media station further includes a mechanical clip attached to the base station for clipping the wireless media station to a person's clothing or accessory.

In some aspects, both the earbud connector and the base station connector are audio connectors, wherein one of the audio connectors is a female audio connector and the other is a male audio connector. In some aspects, the personal wireless media station further includes a camera module integrated with the base station. In some aspects, the personal wireless media station further includes a microphone integrated with the base station, wherein the personal wireless media station plays sound of telephonic conversation from the paired mobile computing device. When the earbud connector is connected to the base station connector, the sound of telephonic conversation plays through the earbud while the user's voice is inputted through the microphone of the base station.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIGS. 17A-17D illustrate a personal wireless media station having an alternative docking mechanism, according to an example embodiment;

FIGS. 18A-18D illustrate a personal wireless media station having an alternative docking mechanism, according to an example embodiment;

FIGS. 20A-20D illustrate a personal wireless media station having an alternative docking mechanism, according to an example embodiment;

FIGS. 21A-21C illustrate a personal wireless media station having an alternative docking mechanism, according to an example embodiment; and FIGS. 22A-22C illustrate a personal wireless media station having an alternative docking mechanism, according to an example embodiment.

DETAILED DESCRIPTION OF EMBODIMENTS

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

Need for Convenient Access to Primary Devices

Today, many mobile electronic accessories are available for use in conjunction with mobile electronic devices such as smart phones, tablet computers, and other primary devices. Some of these accessories allow the user to switch between the different ways of accessing the content provided on the primary device. For example, if a user wishes to listen to music without disturbing others around him, rather than using the speaker on his phone, he can use a set of headphones that wirelessly connects to his phone and listen to the music stored on his phone through the headphones. Other accessories allow the user to access the content provided on the primary device in a more convenient manner. For example, a user may keep her smart phone in her purse (e.g., her smart phone may be too big to fit in her pocket). If she does not wish to constantly reach into her purse and take out her phone to check the messages received on her phone, she can use a smart watch that wirelessly connects to her phone and read and respond to the messages using the touch screen on the smart watch.

Personal Wireless Media Station

Figure 1:
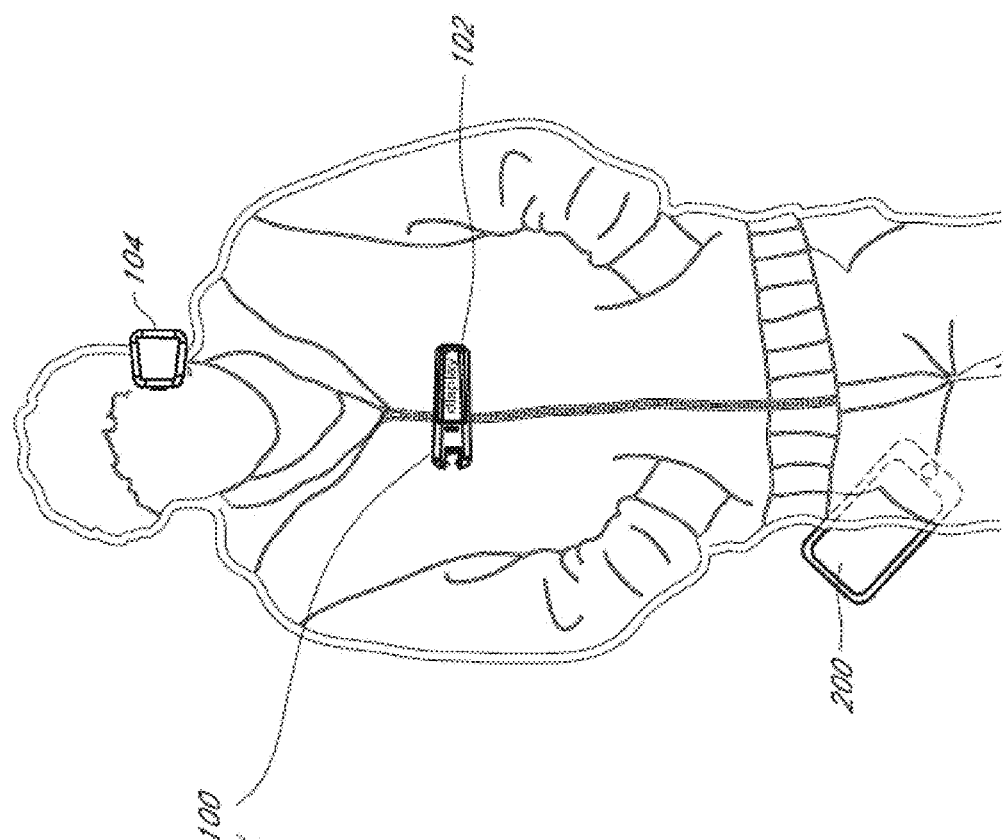
FIG. 1 illustrates an example use of a personal wireless media station in accordance with an embodiment.
Figure 2:
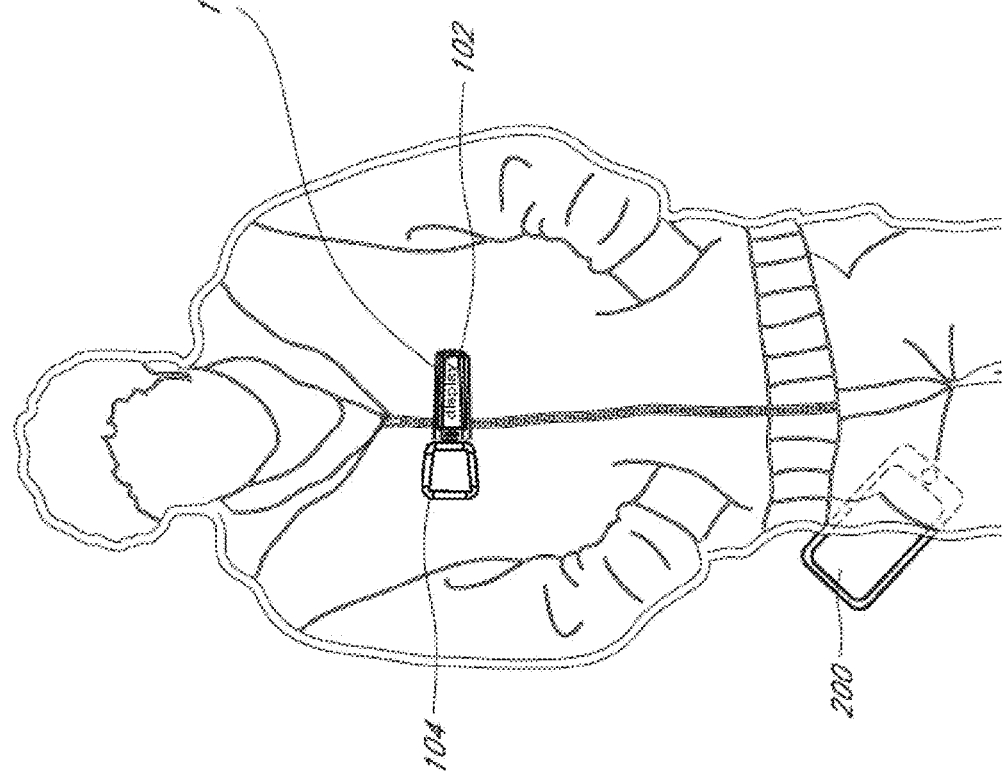
FIG. 2 illustrates an example use of a personal wireless media station in accordance with an embodiment.
Figure 3:
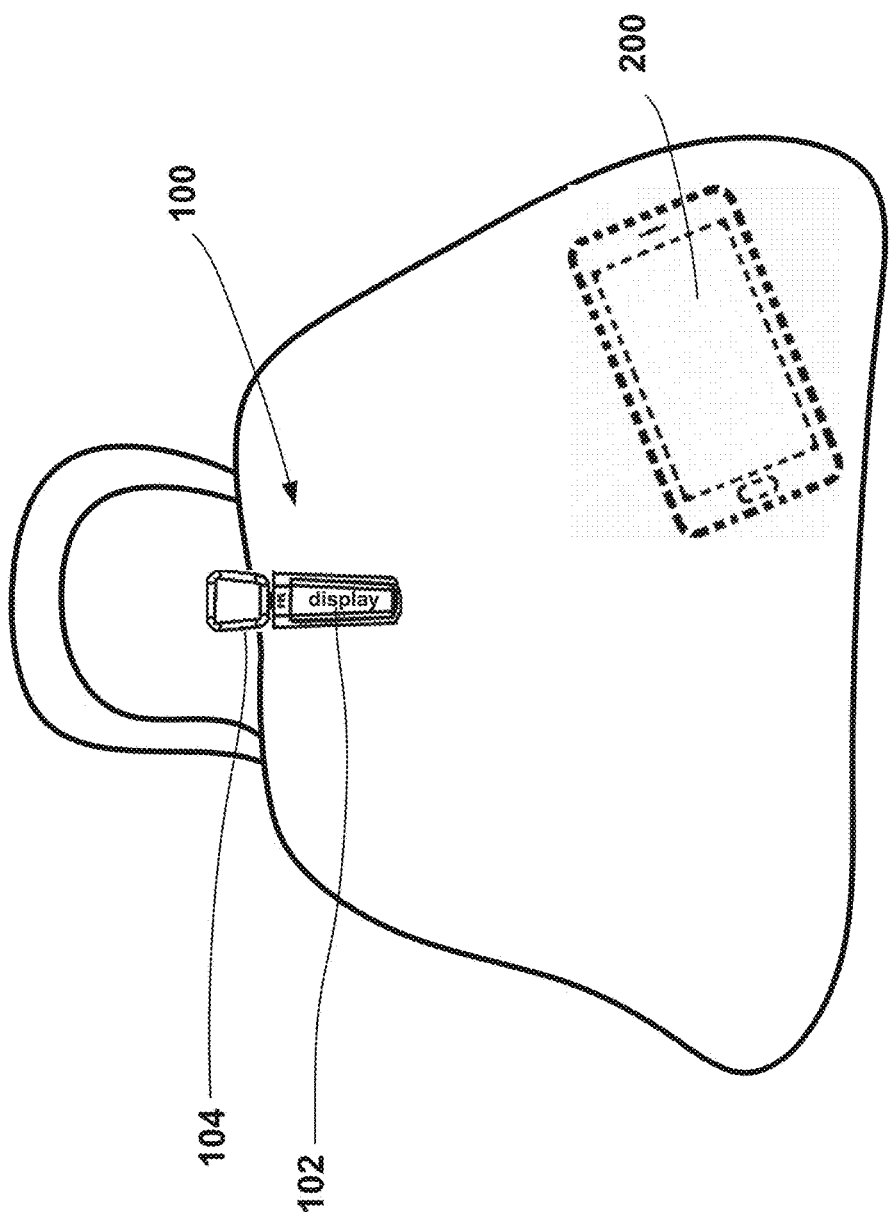
FIG. 3 illustrates an example use of a personal wireless media station in accordance with an embodiment.

In one aspect, the invention provides a personal wireless media station 100 as exemplified in FIGS. 1-3. The personal wireless media station 100 can be wireless connected to the user's primary device 200 (e.g., smart phones, tablet computers, etc.) and facilitate the user's access to the content provided on the primary device 200. For example, once wirelessly connected to the primary device 200, the personal wireless media station 100 can display messages received on the primary device 200 and play music stored on or streamed to the primary device 200.

Base Station and Earbud

Referring to FIGS. 1 and 2, the personal wireless media station 100 includes a base station 102 and a wireless earbud 104. The base station 102 includes a speaker for providing sound data and a display surface for providing visual data. The wireless earbud 104 includes a speaker for providing sound data. The wireless earbud 104 is configured to be docked (e.g., connected both mechanically and electrically) to the base station 102. In embodiments, the playing mode of the personal wireless media station 100 may be based on whether or not the wireless earbud 104 is docked to the base station 102.

Wearing and Carrying Personal Wireless Media Station

The clip provided on the base station 102 allows the personal wireless media station 100 to be clipped to the user's clothing or other possessions. The clip allows the user to keep the personal wireless media station 100 in a place that is easily accessible and visible as illustrated in FIGS. 1-3.

Accessing Primary Device Content Via Base Station

FIG. 1 illustrates an example in which the wireless earbud 104 is docked to the base station 102. As shown in FIG. 1, the user can leave his primary device 200 in his pocket and access the content on the primary device 200 via the personal wireless media station 100. For example, when a new message arrives on the primary device 200, the user can check the content of the message by simply gripping and turning the base station 102 with fingers such that the display surface faces upward for him to read the message displayed on the display surface. As another example, the user can play the music stored on the primary device 200 through the speaker provided on the personal wireless media station 100. As illustrated by these examples, the personal wireless media station 100 provides convenient wireless access to the content on the primary device 200 without requiring the user to physically maneuver the primary device 200.

Accessing Primary Device Content Via Base Station and Wireless Earbud

FIG. 2 illustrates an example in which the wireless earbud 104 is undocked from the base station 102. As shown in FIG. 2, the user can undock the wireless earbud 104 and plug it into his ear to listen to the music stored on the primary device 200 through the speaker on the wireless earbud 104. Even when the wireless earbud 104 is undocked from the base station 102, the user can still use the display surface of the base station 102 to access the content provided on the primary device 200, such as text, email, and other data. For example, the display surface on the base station 102 may display the name and/or lyric of the song that is currently being played through the speaker on the wireless earbud 104 or display an incoming message received on the primary device 200.

Reading Messages and Answering Calls without Touching Your Phone

FIG. 3 illustrates another example in which the wireless earbud 104 is docked to the base station 102. The personal wireless media station 100, which is clipped to the top of the purse and sitting in plain view, is much more accessible than the primary device 200 buried at the bottom of the purse. For example, the user can read incoming messages via the display surface on the base station 102 and answer incoming calls using the wireless earbud 104 without touching the phone as is in the examples illustrated in FIGS. 1 and 2.

Docking and Undocking of Personal Wireless Media Station

Figure 4A:
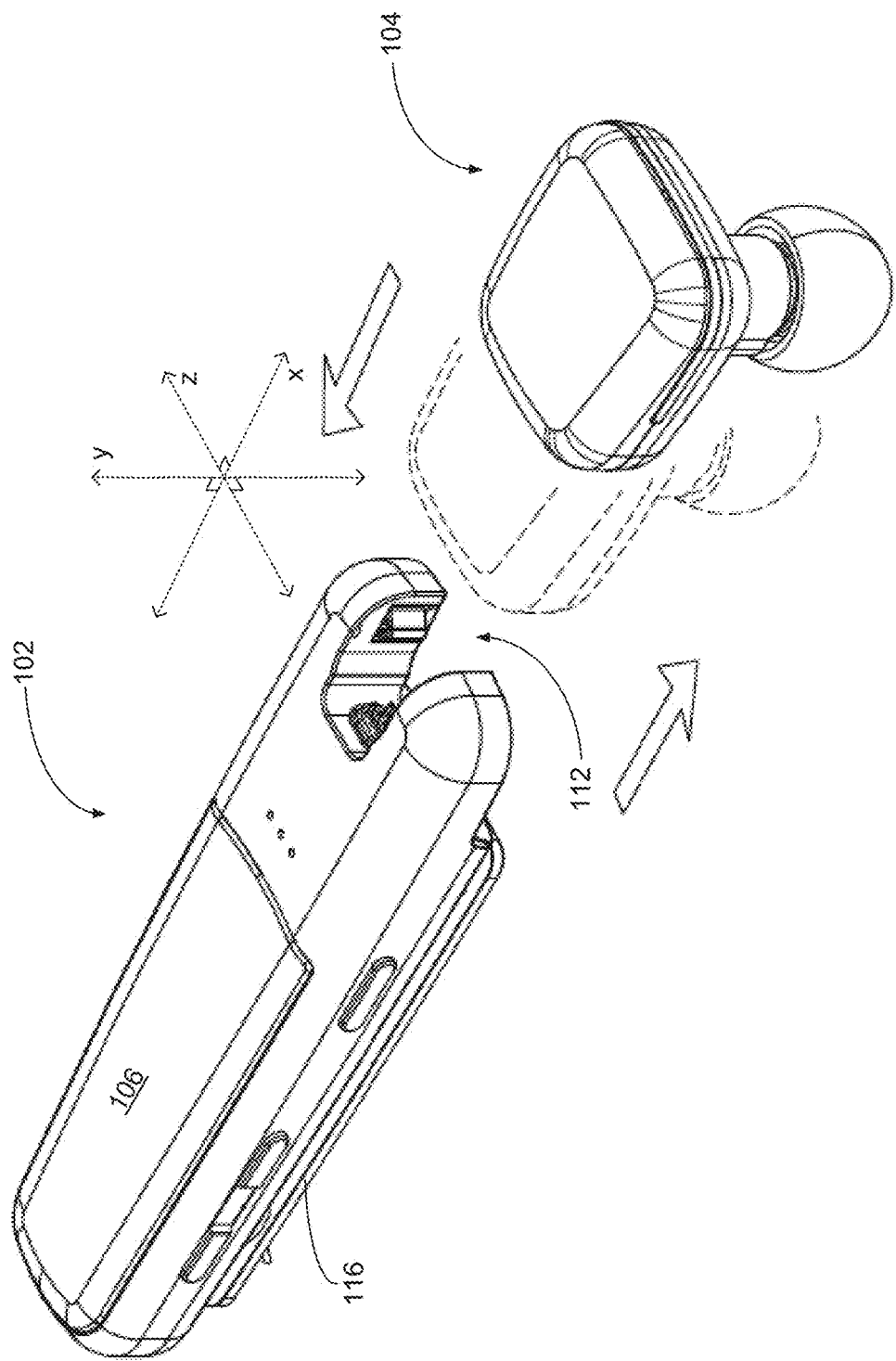
FIG. 4A illustrates a perspective view of a personal wireless media station in accordance with an embodiment.
Figure 4B:
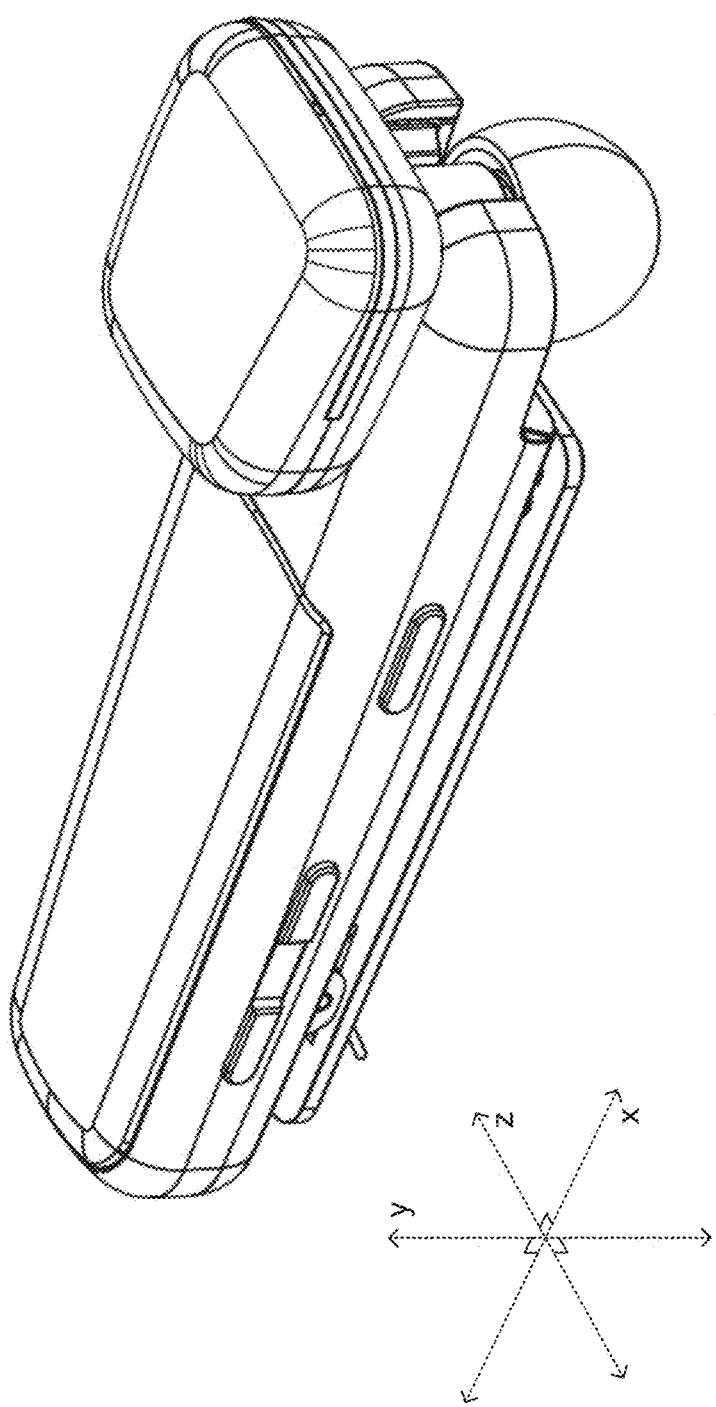
FIG. 4B illustrates a perspective view of a personal wireless media station in a docked position in accordance with an embodiment.

In embodiments, the wireless earbud 104 can be docked to and undocked from the base station 102. The base station 102 provides a docking bay 112 to receive the wireless earbud 104. Referring to FIG. 4A, the earbud 104 can be docked to the base station 102 by moving the earbud 104 along the X axis toward the base station 102 (specifically to the docking bay 112) while generally maintaining the earbud 104 at a position in the Y and Z axes corresponding to the docking bay 112. FIG. 4B illustrates a state in which the earbud 104 is docked with the base station 102, in which a waist portion (middle in the Y axis) of the earbud 104 is located within the docking bay 112. Referring back to FIG. 4A, the earbud 104 can be undocked from the base station 102 by moving the earbud 104 along the X axis away from the base station 102.

Base Station

Figure 5A:
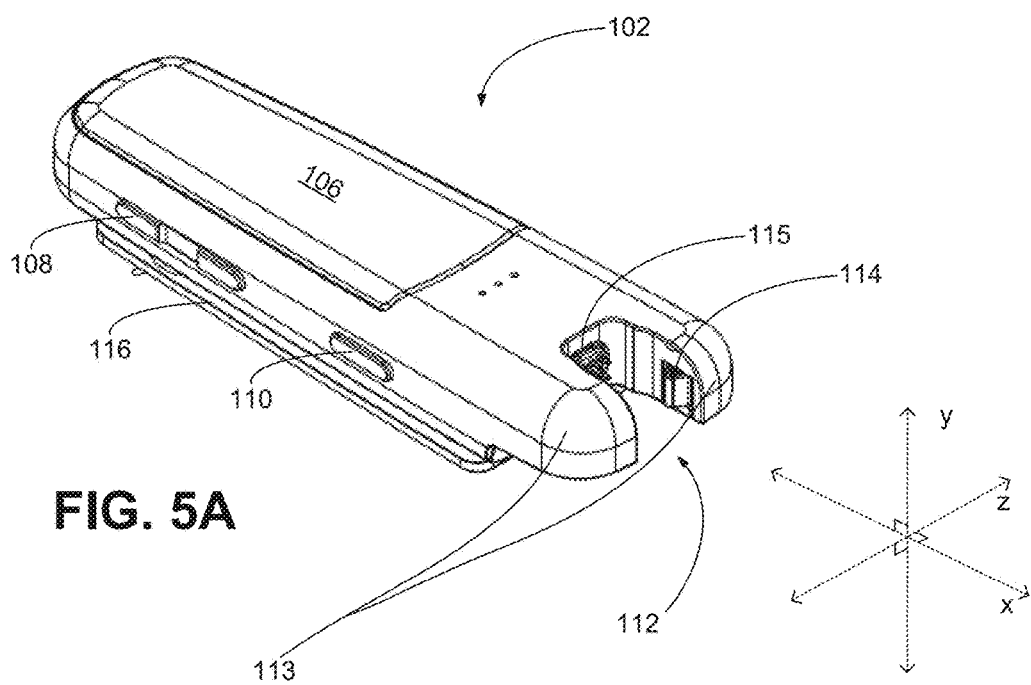
FIG. 5A illustrates a perspective view of a base station of the personal wireless media station in accordance with an embodiment.

Referring to FIG. 5A, the base station 102 includes a display surface 106, a docking bay 112, contact connectors 115, and a clip 116. Although not shown in FIG. 4B, in embodiments, the base station 102 includes at least one speaker, a battery, and/or a microphone. In some embodiments, the base station includes one or more of volume control buttons 108, a function control button 110 and a camera.

Display Surface

In embodiments, a display panel is provided under the display surface 106. The display panel may incorporate an available display technology such as LCD and OLED technologies. In embodiments, the display surface 106 is capable of displaying information including incoming call information, song information, text information, email information, photographic information and the like.

Volume Control Buttons

In embodiments, the volume control buttons 108 are used to increase or decrease the volume of the speaker of the base station 102 and/or the speaker of the wireless earbud 104. When the earbud 104 is docked to the base station 102, in response to a volume control input at the volume control buttons 108, base station increase or decrease the volume of its own speaker, i.e., the speaker of the base station 102. When the earbud 104 is undocked from the base station 102, however, in response to a volume control input at the volume control buttons 108, the base station 102 wirelessly communicates with the earbud 104 to increase or decrease the volume of the speaker of the earbud 104. In the alternative, when the earbud 104 is undocked from the base station 102, in response to a volume control input at the volume control buttons 108, the base station 102 wirelessly communicates with the primary device 200 for controlling the volume of the speaker of the earbud 104. In addition, the volume control buttons 108 can be used to increase or decrease the size of the text displayed on the display surface 106, to increase or decrease the scrolling speed of the text displayed on the display surface, and/or to go to the next page or the previous page of the text, email, or other information displayed on the display surface 106.

Function Control Button

In embodiments, the function control button 110 is used to activate or deactivate a variety of functions available on the personal wireless media station 100. One or more functions described herein (e.g., enabling/disabling modes or components, activating/deactivating modes or components, causing the personal wireless media station 100 to perform certain actions, etc.) may be activated or deactivated by pressing the function control button, pressing and holding the function control button for a threshold period of time (e.g., 1 second, 2 seconds, 3 seconds, or any other duration), pressing the function control button while another button is pressed (e.g., one or more volume control buttons), or pressing and holding the function control button for a threshold period of time (e.g., 1 second, 2 seconds, 3 seconds, or any other duration) while another button is pressed (e.g., one or more volume control buttons).

Docking Bay

In embodiments, the docking bay 112 is configured, shaped and sized to receive the wireless earbud 104 in a docking space provided therein and allow the wireless earbud 104 to be docked to the base station 102. In the illustrated embodiment, the docking space of the docking bay 112 is provided between two docking arms 113 that are elongated in the X axis and generally parallel to each other with a gap therebetween in the Z axis.

Locking Devices

In embodiments, a locking device 114 is installed on an inner side of each docking arm 113. Each locking device 114 includes a locking protrusion protruding from the corresponding docking arm 113 and a locking mechanism (spring-loaded or elastic) exerting force on the locking protrusion toward the opposite docking arm along the z-axis. When the earbud 104 is securely docked in the docking space created by the docking bay 112, the locking devices 114 provided on the docking arms 113 hug the waist portion of the earbud 104. In some embodiments, when the earbud 104 is securely docked to the base station 102 in the desired position, the locking devices 114 are in contact with the rear portions (portions that are farther away from the connectors 115 along the x-axis) of the waist portion of the earbud 104 such that the locking devices 114 securely hold the earbud 104 in place in the docked position. In other embodiments, when the earbud 104 is securely docked to the base station 102 in the desired position, the locking protrusions of the locking devices 114 are inserted into the corresponding recesses provided on the waist portion of the earbud 104 such that the locking devices 114 securely hold the earbud 104 in place in the docked position.

Cross-Section of Docking Bay

Figure 5B:
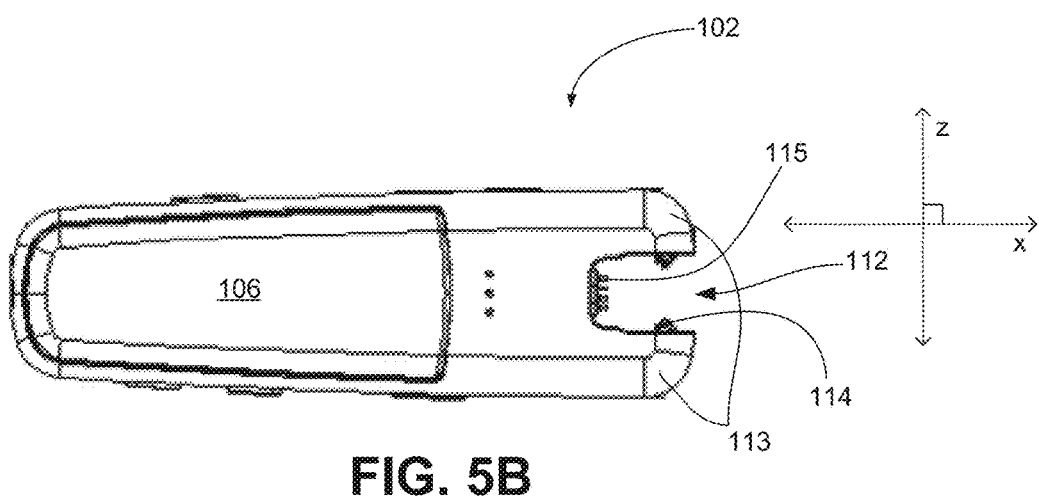
FIG. 5B illustrates a top view of a base station of the personal wireless media station in accordance with an embodiment.

As shown in FIG. 5B, the cross-section of the docking bay 112 of the base station 102 may be substantially in the shape of a "U" having three sides. In some embodiments, the cross-section may include two substantially parallel sides that face each other and a third side adjacent to the two substantially parallel sides. For example, the two sides that face each other may each include a protrusion corresponding to the recess provided on the waist portion of the wireless earbud 104. The third side may include pogo connectors that are spring-loaded in a direction substantially perpendicular to the direction in which the protrusions of the two sides are configured to be retracted.

Gap Between Docking Arms

The docking arms 113 are distanced apart to allow sliding in of the waist of the wireless earbud 104 for docking (attaching) or undocking (detaching). The width of the "U" of the docking bay 112 may be substantially equal to the width of the waist portion 104B of the wireless earbud 104 in the z-axis direction. In some embodiments, the distance between the bottom of the "U" and the portion of the protrusions that is farthest from the bottom of the "U" on the docking arms 113 along the x-axis is substantially equal to the width of the waist portion 104B in the x-axis direction. In other embodiments, the distance between the bottom of the "U" and the portion of the protrusions that is farthest from the bottom of the "U" on the docking arms 113 along the x-axis is less than the width of the waist portion 104B in the x-axis direction. In some embodiments, the distance between the two protrusions on the opposite docking arms along the z-axis is less than the width of the width of the waist portion 104B of the wireless earbud 104 in the z-axis direction.

No Rotation about X-Axis or Y-Axis During Slide-in

In some embodiments, the gap (distance and/or other mechanical structure) in the docking bay 112 is configured such that the wireless earbud 104 can be rotated about neither the x-axis nor the y-axis during sliding as well as while docked. For example, the respective surfaces of the waist of the wireless earbud 104 are flat and parallel to the surfaces of the docking arms 113 facing the respective surfaces of the waist of the wireless earbud 104 while the wireless earbud 104 is slid into the docking space.

Contact Connector

In embodiments, the base station 102 includes contact one or more connectors 115 on an inner side of the docking bay 112 for electrically connecting to the earbud 104 when it is docked to the base station 102. When the earbud 104 is docked and secured, the one or more connectors contact one or more counterpart connectors of the earbud 104. When the earbud 104 is pulled away from the base station 102 along the X axis with a threshold amount of force along the X axis, the earbud 104 becomes undocked (the connectors 115 are no longer electrically connected to the corresponding connectors on the earbud 104, and the earbud 104 physically exits the docking bay 112. In embodiments, the one or more connectors 115 include pogo pins although not limited thereto.

Pogo Connectors on Base Station

In some embodiments, the base station and earbud connectors may be pogo connectors. The base station pogo connectors may be configured to be connected with the counterpart pogo connectors provided on the wireless earbud 104 when the wireless earbud 104 is moved into the docking space along the x-axis to be connected with the base station 102. When the wireless earbud 104 is connected with the base station 102, the counterpart pogo connectors on the wireless earbud 104 are in contact with the pogo connectors on the base station 102.

Clip

In embodiments, the clip 116 is integrated with the body of the base station 102. The clip 116 clips the base station 102 to the user's clothing or other belongings (e.g., shirt, tie, pocket, bag, etc.). Instead of the clip 116, the base station 102 may include any other attachment mechanism such as a band or other fasteners for attaching the base station 102 to the user's body, clothing, or other belongings.

Wireless Earbud

Figure 6A:
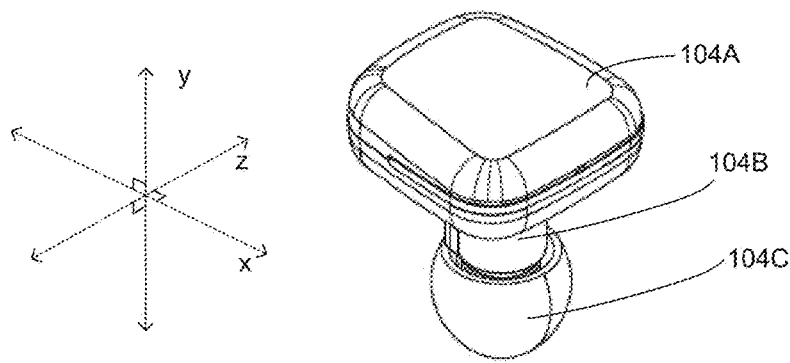
FIG. 6A illustrates a perspective view of a wireless earbud of the personal wireless media station in accordance with an embodiment.
Figure 6B:
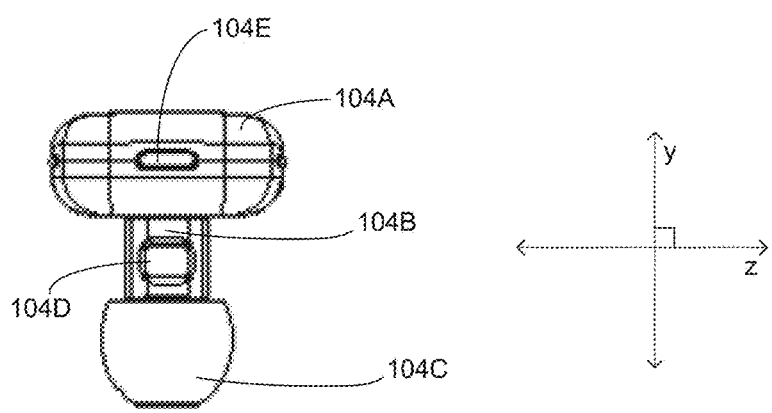
FIG. 6B illustrates a side view of a wireless earbud of the personal wireless media station in accordance with an embodiment.

With reference to FIGS. 6A and 6B, the wireless earbud 104 includes a head portion 104A, a waist portion 104B, and an ear portion 104C. The waist portion 104B includes one or more earbud connectors for connecting with the base station connectors 115 of the base station 102. The waist portion 104B may include one or more recesses for engaging with the locking devices 114 of the base station 102.

Function of Wireless Earbud

In some embodiments, the wireless earbud 104 plays back sound data received from the base station 102. In other embodiments, the wireless earbud 104 plays back sound data received from the primary device 200.

Earbud Connectors

In some embodiments, the waist portion 104B of the wireless earbud 104 may include one or more pogo connectors. In some embodiments, the waist portion 104B of the wireless earbud 104 may include one or more recesses. In some embodiments, the waist portion 104B of the wireless earbud 104 may include one or more pogo connectors and one or more recesses. The pogo connectors are mateable with the base station pogo connectors provided in the docking bay 112 of the base station 102.

Sound Playback Via Wireless Earbud

In some embodiments, the wireless earbud 104 plays back sound received from the base station 102 when the earbud connectors are not connected to the base station connectors. In other embodiments, the wireless earbud 104 plays back sound received from the primary device 200 when the earbud connectors are not connected to the base station connectors.

Waist

The waist portion of the wireless earbud 104 may have a width in the z-axis direction that is slightly narrower than the distance between the docking arms 113 in the z-axis direction such that the waist portion of the wireless earbud 104 can slide into the docking space between the docking arms 113 along the x-axis while maintaining contact with both of the docking arms 113.

Recess on Waist Portion of Wireless Earbud

The waist portion of the wireless earbud 104 may have one or more recesses that match and correspond to the protrusions on the docking arms 113. The protrusions are either in contact with or inserted into the recesses when the wireless earbud 104 is fully docked. The protrusions (locking device) on the docking arms 113 may hug the one or more recesses formed in the waist of wireless earbud 104 or may be inserted into the recesses such that once the wireless earbud 104 is fully docked and the locking device is engaged, the protrusions (locking device) exert enough force on the wireless earbud 104 to prevent the wireless earbud 104 from moving in the x-axis direction, rotating about the y-axis or the z-axis, or moving up or down in the y-axis direction. In some embodiments, the protrusions are configured such that once the wireless earbud 104 is fully docked (e.g., locking device is engaged), a threshold amount of force in the x-axis direction away from the docking space is needed to disengage the locking device. Thus, inadvertent disengaging of the locking device or undocking of the wireless earbud 104 may be prevented.

Position of Locking Device on Docking Arms

In some embodiments, when the wireless earbud 104 is fully docked, the protrusion is returned to its original position (e.g., when the docking space is unoccupied). In other embodiments, when the wireless earbud 104 is fully docked, the protrusion is sitting between its fully-loaded position (e.g., when the amount by which it extends from the docking arm 113 in the z-axis direction is at its minimum) and its original position. In other embodiments, when the wireless earbud 104 is fully docked, the protrusion is sitting at its fully-loaded position (e.g., when the amount by which it extends from the docking arm 113 in the z-axis direction is at its minimum).

Undocking Wireless Earbud

One or both of the docking arms 113 may have a spring-loaded or elastic protrusion (locking device) that is configured to convert the force exerted thereon in the x-axis direction into the protrusion's outward movement in the z-axis direction (e.g., away from the docking space) when the wireless earbud 104 is slid out of the docking space in the x-axis direction. When the earbud is fully undocked, the spring-loaded or elastic protrusion (locking device) returns to its original position and stops exerting inward force.

Guide Surface on Head Portion of Wireless Earbud

In some embodiments, the head portion of the wireless earbud 104 has a flat (planar) surface on the x-z plane parallel to the display surface 106. While the wireless earbud 104 is slid into the docking space and when the wireless earbud 104 is fully docked, the flat (planar) surface maintains contact with a counterpart flat (planar) surface on the base station 102.

Guide Surface on Waist Portion of Wireless Earbud

In some embodiments, the waist portion of the wireless earbud 104 has two flat (planar) surfaces respectively maintaining contact with the docking arms 113 while the wireless earbud 104 is slid into the docking space and when the wireless earbud 104 is fully docked. In some embodiments, the flat (planar) surface on the head portion of the wireless earbud 104 and the flat (planar) surfaces on the waist portion of the wireless earbud 104 all maintain contact with the respective counterpart surfaces of the base station 102 while the wireless earbud 104 is slid into the docking space and when the wireless earbud 104 is fully docked.

Guide Surface Restricts Unwanted Movement of Wireless Earbud

In some embodiments, the guide surfaces provided on the wireless earbud 104 restrict unwanted movement of the wireless earbud 104 while the wireless earbud 104 is slid into the docking space and when the wireless earbud 104 is fully docked. For example, maintaining contact between the flat (planar) surface on the head portion of the wireless earbud 104 and the counterpart surface on the base station 102 while the wireless earbud 104 is slid into the docking space and when the wireless earbud 104 is fully docked prevents the wireless earbud 104 from rotating about the x-axis or the z-axis. Further, maintaining contact between the flat (planar) surfaces on the waist of the wireless earbud 104 and the counterpart surfaces on the docking arms 113 while the wireless earbud 104 is slid into the docking space and when the wireless earbud 104 is fully docked prevents the wireless earbud 104 from rotating about the x-axis or the y-axis.

Guide Surface Guides Movement of Wireless Earbud

In some embodiments, the guide surfaces provided on the wireless earbud 104 provide guidance as the wireless earbud 104 is slid into the docking space. For example, maintaining contact between the flat (planar) surface on the head portion of the wireless earbud 104 and the counterpart surface on the base station 102 while the wireless earbud 104 is slid into the docking space and when the wireless earbud 104 is fully docked allows the wireless earbud 104 to maintain its relative position in the y-axis direction with respect to the base station 102, facilitating the docking process.

Space for Wireless Earbud's Ear Portion

In some embodiments, the base station 102 is shaped such that a space is formed on the opposing side of the guide surface on the base station 102 corresponding to the flat (planar) surface on the head portion of the wireless earbud 104. The space has a width in the x-axis direction that is substantially the same as the width of the ear portion of the wireless earbud 104 in the x-axis direction.

Wireless Earbud's Ear Portion does not Touch Base Station

In some embodiments, the ear portion of the wireless earbud 104 is not in contact with any part of the base station 102 when the wireless earbud 104 is fully docked. In other embodiments, the widest portion of the ear portion of the wireless earbud 104 in the x-axis direction is not in contact with any part of the base station 102 when the wireless earbud 104 is fully docked.

Alignment of Wireless Earbud's Ear Portion when Fully Docked

When the wireless earbud 104 is fully docked, the portion of the ear portion of the wireless earbud 104 that is farthest away from the base station connectors in the x-axis direction is substantially aligned with the portion of the docking arms 113 that is farthest away from the base station connectors in the x-axis direction. In some embodiments, when the wireless earbud 104 is fully docked, the portion of the ear portion of the wireless earbud 104 that is farthest away from the base station connectors in the x-axis direction is substantially on the same y-z plane as the portion of the docking arms 113 that is farthest away from the base station connectors in the x-axis direction.

Thickness of Docking Arms

In some embodiments, the docking arms 113 have a thickness in the y-axis direction that is smaller than the thickness of the thinnest portion of the base station 102 in the y-axis direction excluding the docking arms 113. In some embodiments, the docking arms 113 constitute the thinnest portions of the base station 102 in the y-axis direction. By providing thinner docking arms 113 relative to the thickness of the base station 102 in the y-axis direction, the ear portion of the wireless earbud 104 may be positioned within the space adjacent to the base station 102 and the docking arms 113 when the wireless earbud 104 is docked to the base station 102.

Earbud Connectors

The waist portion of the wireless earbud 104 may include connectors that correspond to the connectors provided in the docking bay 112 of the base station 102. The connectors on the wireless earbud 104 and the connectors on the base station 102 may be of the opposite gender. When fully docked in the correct position along the y-axis and at the correct angle along the z-axis, each connector (e.g., pogo pin/connector) of the wireless earbud 104 contacts its corresponding connector (e.g., pogo pin/connector) of the base station 102.

Cross-Section of Earbud's Waist

The cross-section of the waist portion of the wireless earbud 104 may be substantially in the shape of a square or a rectangle. In some embodiments, the cross-section may include two pairs of parallel sides that face each other. For example, the side including the connectors may be opposite and parallel to a side including neither connectors nor recesses. In another example, the side including the connectors may be adjacent to two sides that each include a recess corresponding to the protrusion on the docking arms 113.

In some embodiments, the cross-section of the waist portion may be circular, elliptical, or oval. In other embodiments, the cross-section of the waist portion may include a side that is flat, includes the connectors, and is configured to face the bottom of the "U" of the docking arms 113 when docked to the base station 102, and the remaining portion of the waist portion may be round.

Speaker

The base station 102 and/or the wireless earbud 104 may include one or more speakers for playing back sound data from another user device (e.g., primary device 200) paired with the personal wireless media station 100.

LED Light Indicator

The base station 102 and/or the wireless earbud 104 may include LED light indicators for indicating information to the user by blinking or flashing light therefrom. For example, such LED light indicators may indicate that the battery level is low (e.g., by blinking in red) or that there is an unread message or a missed call (e.g., by lighting up).

Microphone

The base station 102 and/or the wireless earbud 104 may include one or more microphones for capturing sound data and providing the captured sound data to the primary device 200 paired with the personal wireless media station 100.

Other Components of Base Station

Although not shown in FIGS. 4 and 5, the base station 102 may include one or more additional buttons or sensors for receiving the user's input. Such buttons or sensors may include a power button, volume control button(s), touch sensitive button(s), function control button(s), or the like. The base station 102 may include a charging slot (not shown) into which a charging cable (not shown) for charging the personal wireless media station 100 may be inserted. The base station 102 may also include one or more other components that are not illustrated in FIGS. 4 and 5. Further, the base station 102 may include one or more additional wireless earbuds, clips, speakers, LED indicators, microphones, LCD screens, and/or base station connectors. In some embodiments, one or more of the components shown in FIGS. 4 and 5 may be omitted. Further, the base station 102 may include a Bluetooth module (or other communication module) to connect with a mobile device (e.g., primary device 200) and/or a Bluetooth module (or other communication module) to connect with the wireless earbud 104.

Example Architecture of Personal Wireless Media Station

Figure 7:
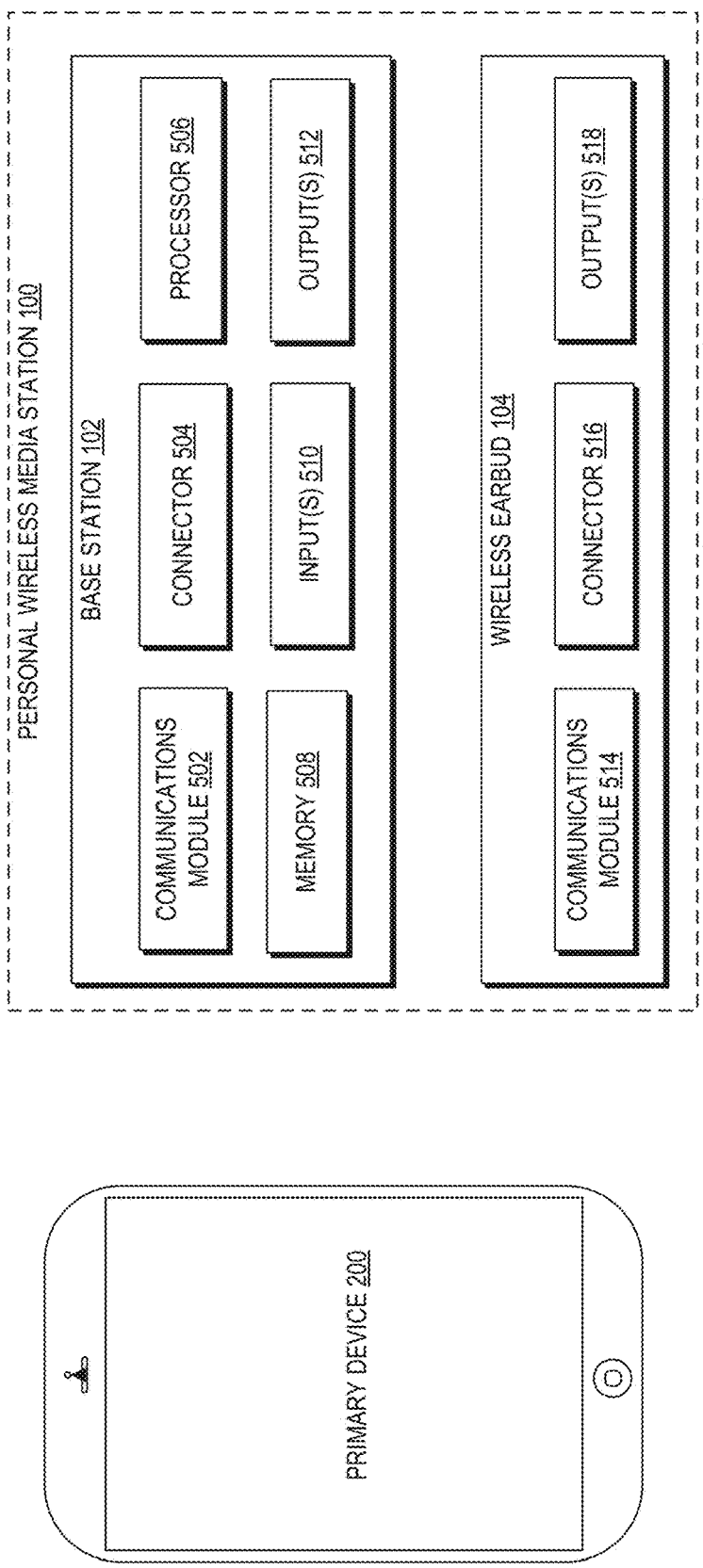
FIG. 7 illustrates a block diagram of a personal wireless media station in accordance with an embodiment.

FIG. 7 illustrates a block diagram of a personal wireless media station 100, according to an example embodiment. As shown in FIG. 7, the personal wireless media station 100 is wirelessly connected to the primary device 200 and includes the base station 102 and the wireless earbud 104.

Example Components of Base Station

As shown in FIG. 7, the base station 102 includes a communications module 502, a base station connector 504, a processor 506, a memory 508, input(s) 510, and output(s) 512. The processor 506 may include one or more processors. The memory 508 may be a volatile memory, a non-volatile memory, or a combination thereof. The input(s) 510 may include one or more microphones, mechanical buttons, touch-sensitive buttons, switches, etc. The output(s) 512 may include one or more speakers, display surfaces, light indicators, etc. As shown in FIG. 7, the base station 102 communicates with the primary device 200 including a mobile application 202 and the wireless earbud 104 including a communications module 514 and output(s) 516.

Example Components of Earbud

As shown in FIG. 7, the wireless earbud 104 includes a communications module 514, an earbud connector 516, and output(s) 516. The output(s) 516 may include one or more speakers, display surfaces, light indicators, etc. Although not illustrated in FIG. 7, the wireless earbud 104 may include one or more inputs such as microphones, mechanical buttons, touch-sensitive buttons, switches, etc.

Communications Module

The communication modules 502 and 514 may be Bluetooth modules configured to establish Bluetooth connections with each other and/or with the primary device 200. Although Bluetooth is used as an example, any other wireless protocols may be used to establish wireless connections between the base station 102 and the wireless earbud 104 and/or between the personal wireless media station 100 and the primary device 200.

Connectors

The connectors 504 and 516 may be pogo pins/connectors of opposite gender. Once electrically connected, the connectors 504 and 516 allow the base station 102 and the wireless earbud 104 to transmit and receive data to and from each other. The data transmission may be two way (e.g., the wireless earbud 104 transmits data to the base station 102 via the connectors, and the base station 102 transmits data to the wireless earbud 104) or one way (e.g., the wireless earbud 104 transmits data to the base station 102 via the connectors but the base station 102 does not or cannot transmit data to the wireless earbud 104, or the base station 102 transmits data to the wireless earbud 104 via the connectors but the wireless earbud 104 does not or cannot transmit data to the base station 102). Although pogo pins/connectors are used as examples, other connectors such as the 3.5 mm jack or other types of connectors.

Processor

The processor 506 may receive data and instructions from other computing systems via the communications module 502. Further, the processor 506 may store data in the memory 508 or retrieve data from the memory 508. The processor 506 may process input data received by the input(s) 510, and provide output data to the output(s) 512. Further, the processor 506 may perform one or more techniques described herein regarding the process of providing and/or redirecting sound playback. For example, the processor 506 may, via one or more sensors or detectors, detect whether the earbud connector of the wireless earbud 104 is connected to the base station connector of the base station 102. Based on whether or not the earbud connector of the wireless earbud 104 is connected to the base station connector of the base station 102, the processor 506 may cause different output(s) (e.g., the speaker on the base station 102 or the speaker on the wireless earbud 104) to play back the sound based on the audio data received from the primary device 200.

Software

The base station 102 may include software or firmware that, when executed by the processor 506, configures the base station 102 to perform one or more processes described herein.

Memory

The memory 508 may store audio data transmitted from the primary device 200. In some embodiments, the memory 508 is a volatile memory and only stores what is currently being transmitted and played back by the personal wireless media station 100. For example, all the data stored in the memory 508 may be lost shortly after use or upon power down of the personal wireless media station 100. In other embodiments, the memory 508 is a nonvolatile memory or a combination of volatile and nonvolatile memory. The memory 508 may include RAM, ROM and/or other persistent, auxiliary or non-transitory computer-readable media. The memory 508 may store computer program instructions to be executed by the processor 506 in the general administration and operation of the personal wireless media station 100. The memory 508 may further include computer program instructions and other data for implementing aspects of the present disclosure.

Input(s)

The base station 102 may include one or more inputs (e.g., physical or digital buttons) that allow the user of the personal wireless media station 100 to enter various user commands. Such buttons or sensors may include a power button, volume control button(s), touch sensitive button(s), function control button(s), or the like. Although not illustrated in FIG. 7, the wireless earbud 104 may include one or more of the inputs described herein.

Output(s)

The base station 102 may include one or more outputs for providing visual or audible information to the user. Such outputs may include one or more speakers, displays, LED indicators, and the like. The speaker may be configured to play sound received from the primary device 200. The sound played via the speaker may be a telephone conversation, a song, a voice recording, an alarm, etc. The display may include one or more display screens that display, e.g., under the control of the processor 506, the data processed by the processor 506. The data may include text, images, or other visual content. For example, the display may be provided on a side surface of the base station 102 as shown in FIG. 4. The one or more display screens can be any of various conventional displays such as a liquid crystal display (LCD), a light-emitting diode (LED) display, an organic light-emitting diode (OLED) display, etc., or any other display means to be developed in the future. In certain embodiments, the display is a color display. In other embodiments, the display is not a color display but is grayscale. Although not illustrated in FIG. 7, the wireless earbud 104 may include one or more of the outputs described herein.

Mobile Phone Application

The primary device 200 may have a mobile application 202 installed thereon for configuring the personal wireless media station 100. For example, the mobile application may be configured to set and monitor the Bluetooth pairing with the personal wireless media station 100. The mobile application 202 may include a feature for finding a personal wireless media station within the communication range. The mobile application 202 may be used to monitor and control the various features of the personal wireless media station 100. The mobile application 202 may be configured to display (or cause the personal wireless media station 100 to display) a low battery warning based on the battery status of the personal wireless media station 100. The mobile phone may be configured to automatically transmit any audiovisual data that may otherwise be displayed on the mobile phone itself to the personal wireless media station 100 when the primary device 200 is paired with the personal wireless media station 100. The mobile application 202 may also receive audio data and image data captured by the personal wireless media station 100 and store the data in a memory (not shown) of the primary device 200.

Other Components of Personal Wireless Media Station

The base station 102 and the wireless earbud 104 of the personal wireless media station 100 are not limited to the configuration illustrated in FIG. 7, and may include one or more other components. For example, the base station 102 may include a camera module configured to capture image data. Such a camera module may communicate with the processor 506 to cause the captured image data to be transmitted to the primary device 200 (e.g., via the communications module 502).

Providing and Redirecting Sound Playback

Referring to FIGS. 8-12, example methods of providing and redirecting sound playback are described. Depending on when and whether the wireless earbud 104 is docked to or undocked from the base station 102, different methods may be utilized to provide sound playback to the user.

Automatic Redirecting Sound Playback

Figure 8:
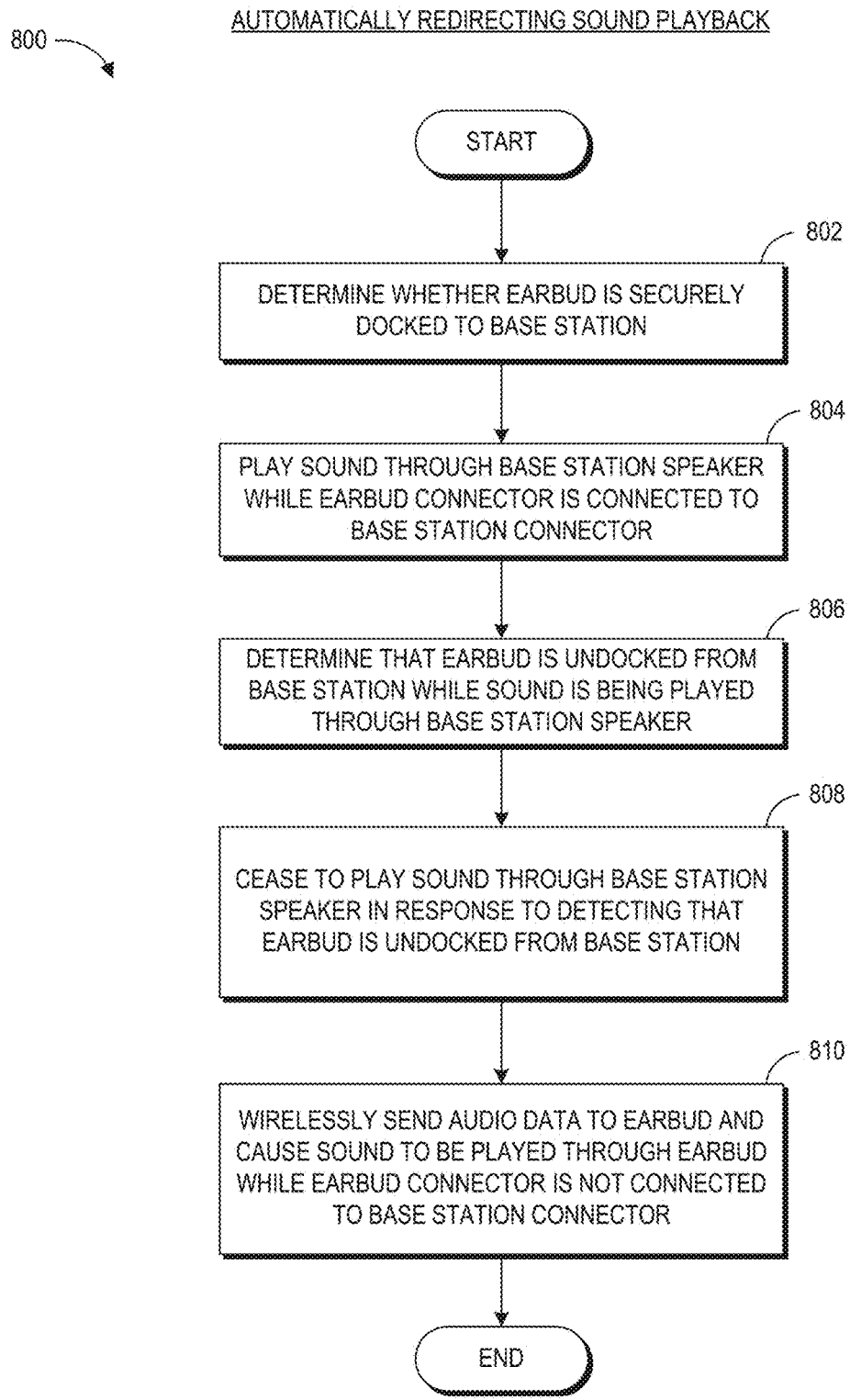
FIG. 8 illustrates a flowchart depicting an example method of redirecting sound playback in accordance with an embodiment.

FIG. 8 is a flowchart for redirecting sound playback, according to an embodiment of the present invention. The steps illustrated in FIG. 8 may be performed by the personal wireless media station 100 of FIG. 7, or any components therein, or any other personal wireless media stations discussed herein or other devices (presently known or developed in the future) within the scope of the present disclosure. For convenience, method 800 is described as performed by the personal wireless media station 100.

Determining Docking

At block 802, the personal wireless media station 100 determines whether the earbud 104 is securely docked to the base station 102. In embodiments, determining docking of the earbud 104 occurs in response to the user action for turning on the personal wireless media station 100 from its turned-off state or in response to the user's command for playing a sound recording or streaming sound from its state where no sound is played. Alternatively, determining docking of the earbud 104 occurs repeatedly while the personal wireless media station 100 is turned on. In embodiments, the base station 102 determines docking of the earbud 104 when detecting that the earbud connector of the wireless earbud 104 is in electrical contact with the base station connector of the base station 102. In contrast, the base station 102 determines undocking of the earbud 104 when detecting that the earbud connector of the wireless earbud 104 is not electrically contacted with the base station connector of the base station 102. In other embodiments, the base station 102 includes at least one electro-mechanical sensor integrated with the locking device 114 for sensing secure docking of the earbud 104 and undocking of the earbud 104.

Playing Sound on Base Station

At block 804, upon determining that the earbud 104 is docked to the base station 102, the personal wireless media station 100 plays sound through the speaker of the base station 102 while the earbud connector is connected to the base station connector. In embodiments, the base station 102 plays sound using audio data from the primary device 200 to which the personal wireless media station 100 is wirelessly connected. In some embodiments, the audio data come from the primary device 200 directly. In other embodiments, the audio data come from the primary device 200 via the earbud 104 which wirelessly communicates with the primary device 200 and communicates with the base station 102 via the connectors.

Detecting Earbud Undocked

At block 806, the personal wireless media station 100 determines that the earbud 104 is undocked from the base station 102 while sound is being played on the base station 102. In embodiments, determining undocking of the earbud 104 is performed in the same or similar manner as for determining docking of the earbud. In embodiments, the base station detects undocking of the earbud 104 by detecting that the base station connector has lost the electric contact from the earbud connector.

Ceasing to Play Sound on Base Station

At block 808, the personal wireless media station 100 ceases to play the sound it was playing through the speaker of the base station 102 in response to determining that the earbud 104 is undocked from its docked state.

Playing Sound on Earbud

At block 810, along with ceasing to play sound on the base station 102, the earbud 104 takes over the task of playing the sound that the base station 102 was playing. In some embodiments, the base station 102 wirelessly sends audio data for the sound to the wireless earbud 104 for playing through the wireless earbud 104. In other embodiments, the base station 102 wirelessly communicates to the primary device 200 to inform undocking of the earbud 104 and to request that the primary device 200 sends the audio data to the earbud 104 directly. In such embodiments, in response to the request, the primary device 200 wirelessly sends the audio data to the earbud 104 such that the earbud 104 plays the sound that the base station 102 has played and ceased to play.

No Action Other Than Undocking for Redirecting to Earbud

As discussed above, there may be situations when the user may want to have a call or listen to the music privately using the wireless earbud 104. In such situations, the user can simply unplug the wireless earbud 104 from the base station 102 of the personal wireless media station 100, and the sound information received from the user device 206 automatically begins to be played back via the wireless earbud 104 without the user having to taking any actions (e.g., no actions to activate the wireless earbud 104 and wirelessly connect to the base station 102 or primary device 200) other than undocking the wireless earbud 104 from the base station 102.

Initiating Sound Playback in Response to User Request

Figure 9:
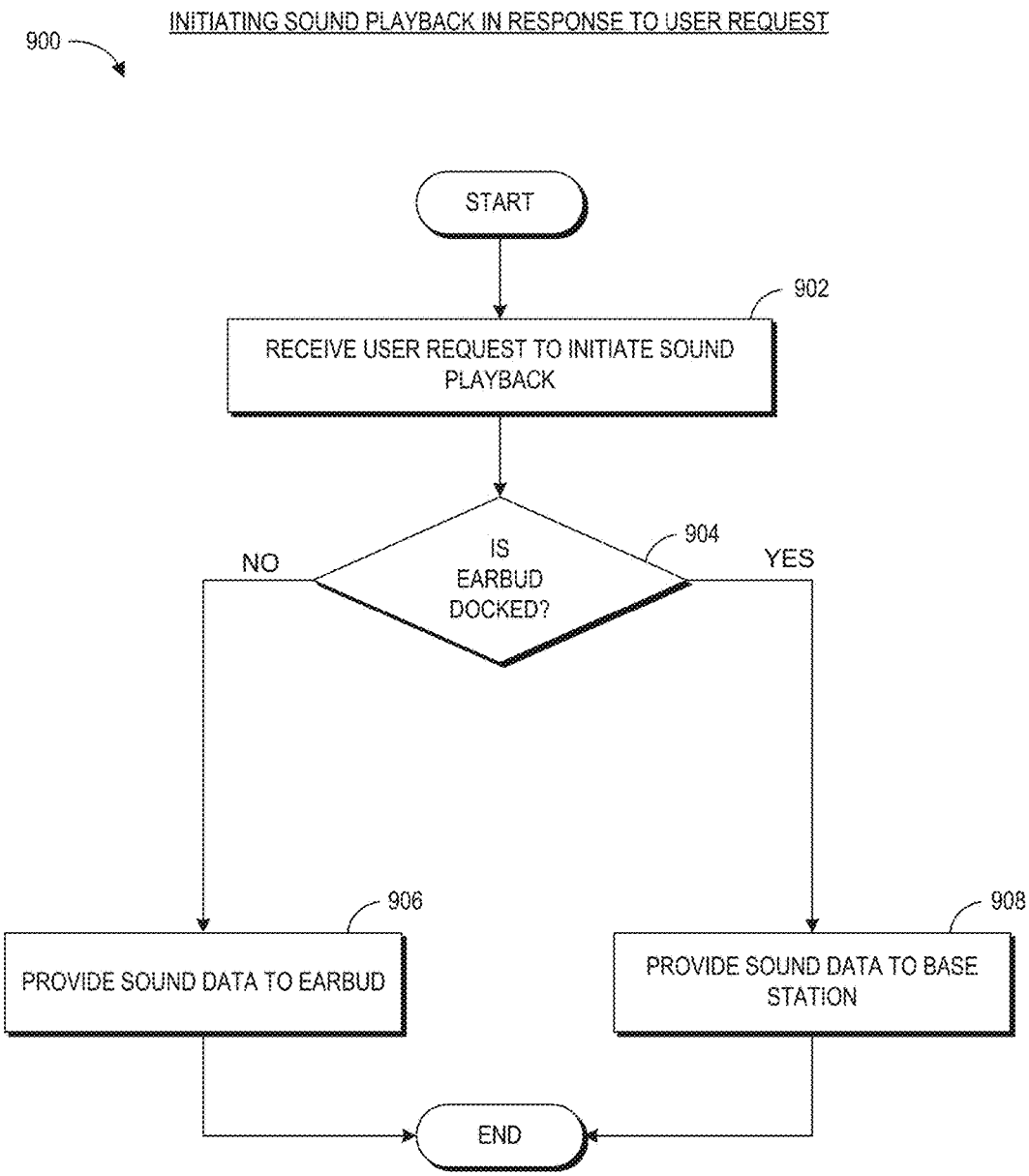
FIG. 9 illustrates a flowchart depicting an example method of initiating sound playback in accordance with an embodiment.

FIG. 9 is a flowchart for initiating sound playback, according to an embodiment of the present invention. The steps illustrated in FIG. 9 may be performed by the personal wireless media station 100 of FIG. 7, or any components therein, or any other personal wireless media stations discussed herein or other devices (presently known or developed in the future) within the scope of the present disclosure. For convenience, method 900 is described as performed by the personal wireless media station 100.

At block 902, the personal wireless media station 100 receives a user request to initiate sound playback. In embodiments, the user request may be received in response to the user pressing a button (either mechanical or digital) on the personal wireless media station 100 or the primary device 200 to accept an incoming call, to play a song, to play a voice message or voicemail, or to perform any other action that may involve providing sound playback. At block 904, the personal wireless media station 100 determines whether the wireless earbud 104 is docked to the base station 102. If the personal wireless media station 100 determines that the wireless earbud 104 is not docked to the base station 102, the method 900 proceeds to block 906. Otherwise, the method 900 proceeds to 908.

In embodiments, determining whether the earbud 104 is docked or not is performed in the same or similar manner as discussed herein in connection with other embodiments. For example, the personal wireless media station 100 may determine whether or not the wireless earbud 104 is docked based on whether the base station and earbud connectors are electrically connected or not. In some embodiments, the determination of whether the base station and earbud connectors are electrically connected or not is made every time sound playback is initiated or requested. In other embodiments, the determination of whether the base station and earbud connectors are electrically connected or not is made periodically regardless of whether sound playback is initiated or requested. In other embodiments, the determination of whether the base station and earbud connectors are electrically connected or not is made in response to the docking or undocking of the wireless earbud 104. For example, when the wireless earbud 104 becomes docked or undocked, a signal or instruction may be sent to the processor 506 to make such a determination.

At block 906, the personal wireless media station 100 provides sound playback through the speaker on the wireless earbud 104. At block 908, the personal wireless media station 100 provides sound playback through the speaker on the base station 102. The sound played back via the speaker may be an incoming voice call, music stored on the primary device 200, a voicemail received on the primary device 200, or any other voice data stored on the primary device 200 or the personal wireless media station 100.

In the method 900, one or more of the blocks shown in FIG. 9 may be removed (e.g., not performed) and/or the order in which the method is performed may be switched. In some embodiments, additional blocks may be added to the method 900. For example, in some embodiments, block 904 may be omitted, and the sound playback may be automatically provided via the primary speaker. In some of such embodiments, the identity of the primary speaker may be updated only when the docking/undocking status is changed (i.e., upon docking and undocking of the wireless earbud 104). In some other such embodiments, the circuitry is configured such that the sound playback is automatically provided via the base station speaker if the wireless earbud 104 is docked and via the earbud speaker if the wireless earbud 104 is undocked. Thus, the embodiments of the present disclosure are not limited to or by the example shown in FIG. 9, and other variations may be implemented without departing from the spirit of this disclosure.

Primary Device Sending Sound Data to Earbud

Figure 10:
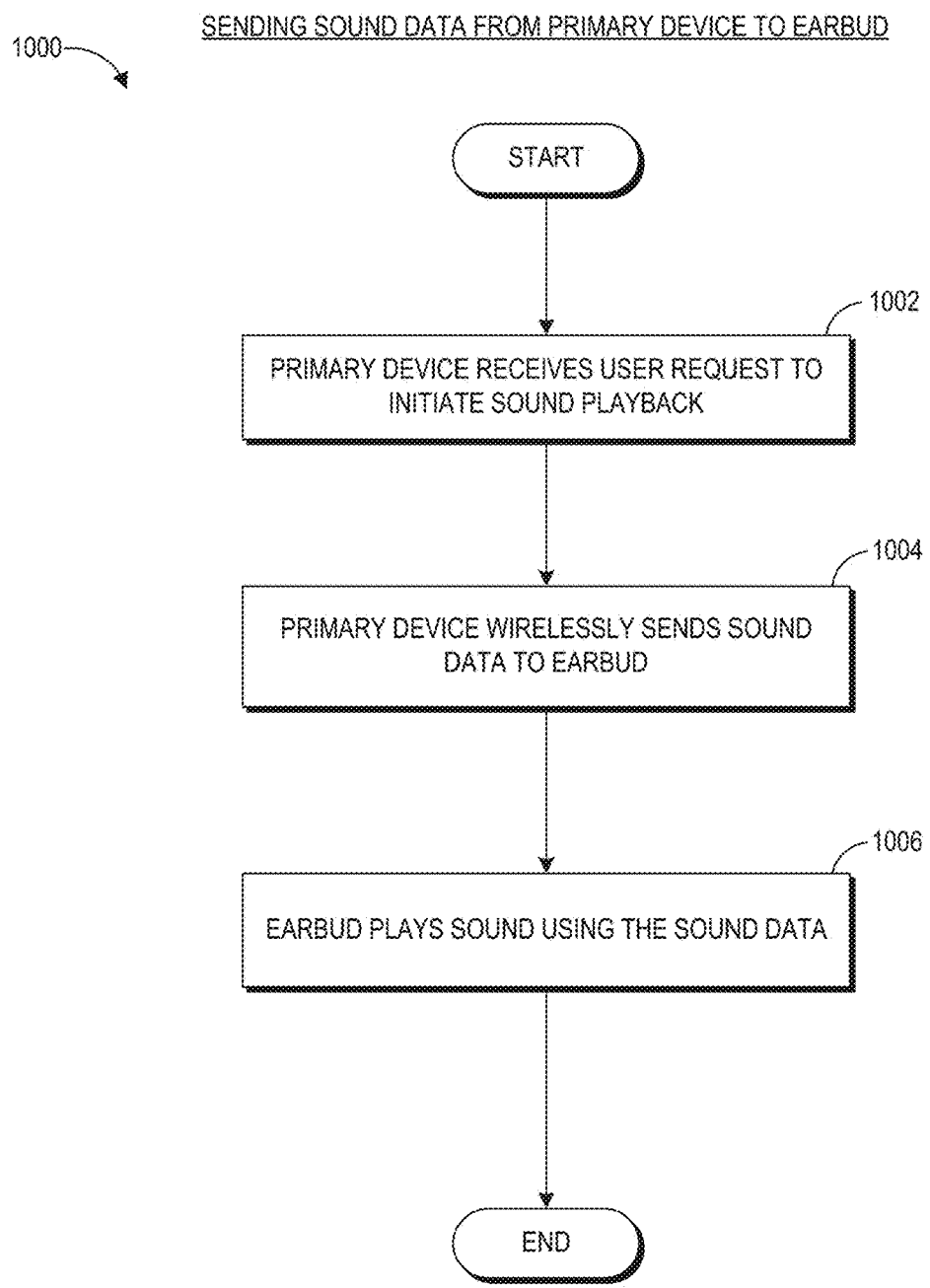
FIG. 10 illustrates a flowchart depicting an example method of initiating sound playback via the earbud speaker in accordance with an embodiment.

FIG. 10 is a flowchart for initiating sound playback, according to an embodiment of the present invention. The steps illustrated in FIG. 10 may be performed by the personal wireless media station 100 of FIG. 7, or any components therein, or any other personal wireless media stations discussed herein or other devices (presently known or developed in the future) within the scope of the present disclosure. For convenience, method 1000 is described as performed by the primary device 200.

At block 1002, the primary device 200 receives a user request to initiate sound playback. For example, the user request may be received in response to the user pressing a button (either mechanical or digital) on the personal wireless media station 100 or the primary device 200 to accept an incoming call, to play a song, to play a voice message or voicemail, or to perform any other action that may involve providing sound playback.

At block 1004, in response to receiving the request to initiate sound playback, the primary device 200 wirelessly sends sound data to the wireless earbud 104. If needed, the primary device 200 established a wireless link with the earbud 104. In embodiments, in or before sending the sound data to the earbud 104, the primary device 200 does not make determination as to whether the earbud 104 is docked to or undocked from the base station 104.

At block 1006, in response to receiving the sound data, the earbud plays sound using the sound data from the primary device 200. The sound played back via the speaker may be an incoming voice call, music stored on the primary device 200, a voicemail received on the primary device 200, or any other voice data stored on the primary device 200 or the personal wireless media station 100.

Redirecting Sound Playback when Earbud Becomes Undocked

Figure 11:
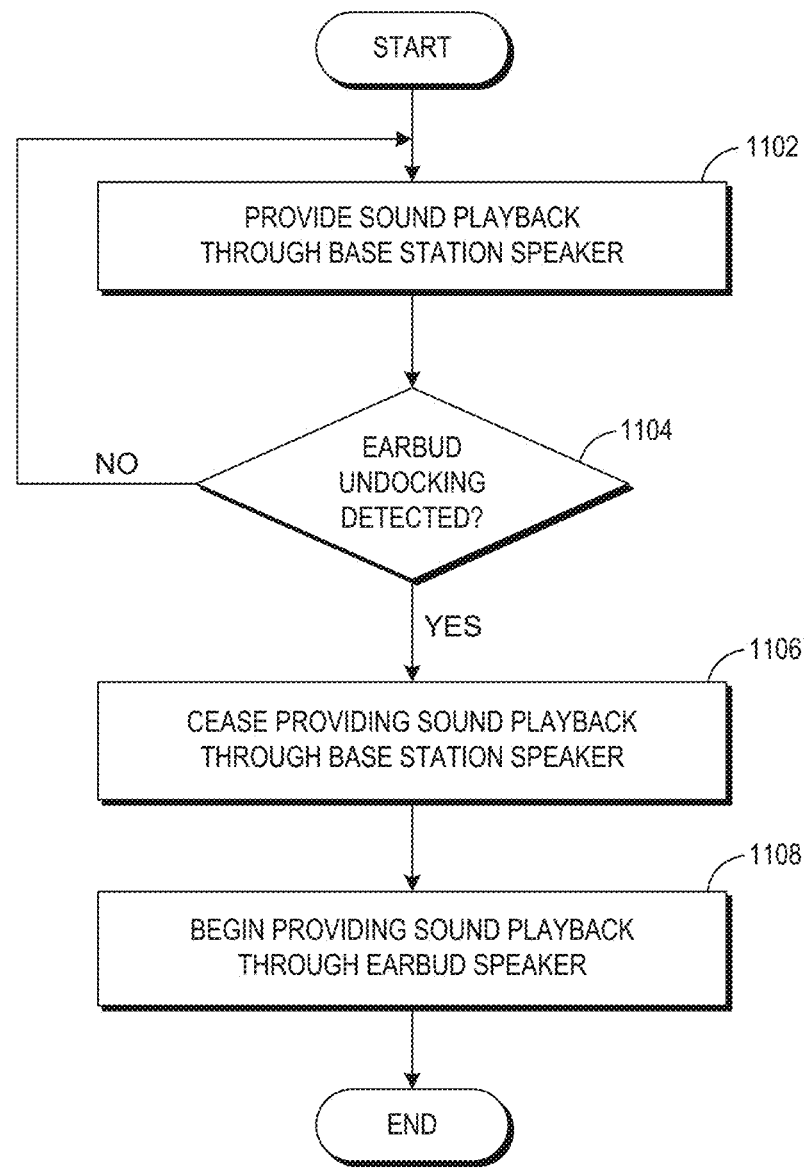
FIG. 11 illustrates a flowchart depicting an example method of redirecting sound playback in accordance with an embodiment.

FIG. 11 is a flowchart for redirecting sound playback, according to an embodiment of the present invention. The steps illustrated in FIG. 11 may be performed by the personal wireless media station 100 of FIG. 7, or any components therein, or any other personal wireless media stations discussed herein or other devices (presently known or developed in the future) within the scope of the present disclosure. For convenience, method 1100 is described as performed by the personal wireless media station 100.

At block 1102, the personal wireless media station 100 provides sound playback through the base station speaker. The sound played back via the speaker may be an incoming voice call, music stored on the primary device 200, a voicemail received on the primary device 200, or any other voice data stored on the primary device 200 or the personal wireless media station 100.

At block 1104, the personal wireless media station 100 determines whether the wireless earbud 104 has been undocked from the base station 102 while playing sound on the base station 102. If the personal wireless media station 100 determines that the wireless earbud 104 has been undocked from the base station 102, the method 1100 proceeds to block 1106. Otherwise, the method 1100 returns to block 1102, and the personal wireless media station 100 continues to provide sound playback through the base station speaker.

In embodiments, the base station 102 runs a routine to detect that the earbud 104 is undocked periodically and repeatedly while the sound is being played on the base station 102. In other embodiments, the base station 102 does not has such a routine and rather waits for signals from the earbud 104 that indicates it has been undocked.

In embodiments, the personal wireless media station 100 may determine whether or not the wireless earbud 104 has been undocked based on whether the base station and earbud connectors have been electrically disconnected or not. In other embodiments, the base station 102 includes at least one electro-mechanical sensor integrated with the locking device 114 for sensing secure docking of the earbud 104 and undocking of the earbud 104.

At block 1106, the base station 102 ceases or stops playing the sound in response to the determination that the earbud 104 has been undocked. At block 1108, the personal wireless media station 100 begins providing sound playback through the earbud speaker immediately after or substantially simultaneously with stopping to play on the base station 102. Here, immediately after or substantially simultaneously means within 0.03, 0.05, 0.08, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 seconds from stoppage of playing sound on the base station 102 or from determination that the earbud 104 has been undocked.

As discussed above, there may be situations when the user may want to have a voice call or listen to music privately using the wireless earbud 104. In such situations, the user can simply unplug the wireless earbud 104 from the base station 102, and the sound data received from the primary device 200 automatically begins to be played back via the speaker on the wireless earbud 104 without the user having to activate the wireless earbud 104 or press any button(s). In the method 1100, one or more of the blocks shown in FIG. 11 may be removed (e.g., not performed) and/or the order in which the method is performed may be switched. In some embodiments, additional blocks may be added to the method 1100. For example, in some embodiments, block 1104 may be omitted, and the sound playback may be automatically provided via the primary speaker. In some of such embodiments, the circuitry is configured such that the sound playback is automatically provided via the base station speaker if the wireless earbud 104 is docked and via the earbud speaker if the wireless earbud 104 is undocked. Thus, the embodiments of the present disclosure are not limited to or by the example shown in FIG. 11, and other variations may be implemented without departing from the spirit of this disclosure.

Redirecting Sound Playback when Earbud Becomes Docked

Figure 12:
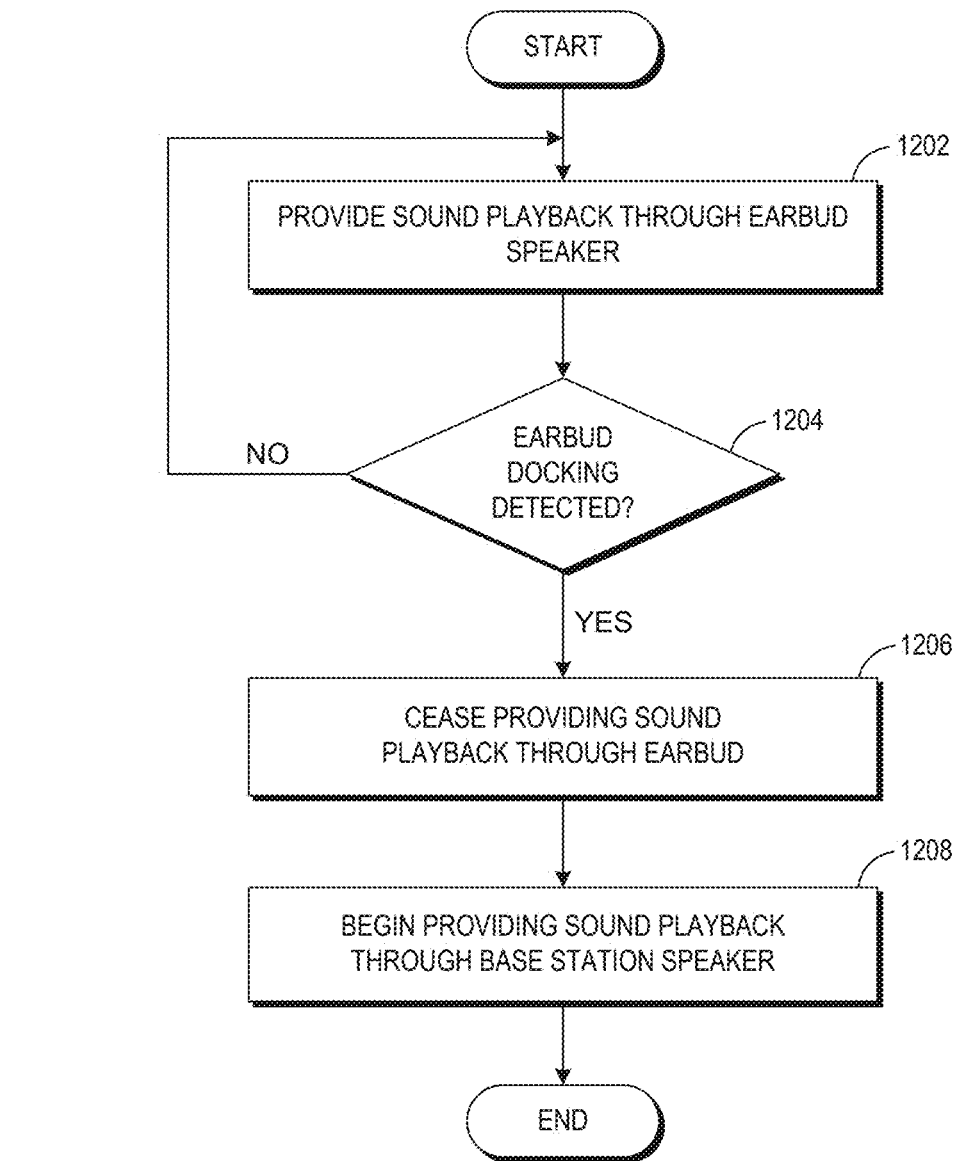
FIG. 12 illustrates a flowchart depicting an example method of redirecting sound playback in accordance with an embodiment.
Figure 13A:
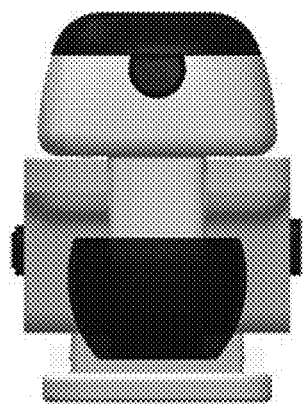
FIGS. 13A and 13B illustrate different views of a personal wireless media station, according to an example embodiment.
Figure 13B:
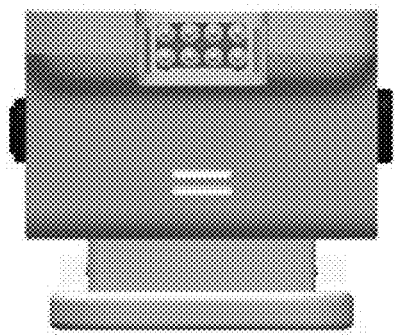

FIG. 12 is a flowchart for redirecting sound playback, according to an embodiment of the present invention. The steps illustrated in FIG. 12 may be performed by the personal wireless media station 100 of FIG. 7, or any components therein, or any other personal wireless media stations discussed herein or other devices (presently known or developed in the future) within the scope of the present disclosure. For convenience, method 1200 is described as performed by the personal wireless media station 100.

At block 1202, the personal wireless media station 100 provides sound playback through the speaker of the earbud 104. The sound played back via the speaker may be an incoming voice call, music stored on the primary device 200, a voicemail received on the primary device 200, or any other voice data stored on the primary device 200 or the personal wireless media station 100.

At block 1204, the personal wireless media station 100 determines whether the wireless earbud 104 has been docked to the base station 102 while the sound is being played. In embodiments, determining docking of the earbud 104 is performed in the same or similar manner as for determining docking of the earbud. If the personal wireless media station 100 determines that the wireless earbud 104 has been docked to the base station 102, the method 1200 proceeds to block 1206. Otherwise, the method 1200 returns to block 1202, and the personal wireless media station 100 continues to provide sound playback through the earbud speaker.

In embodiments, the base station 102 has the information that the earbud 104 is playing the sound while the sound is being played on the earbud 104. In embodiments, the base station 102 may determine whether or not the wireless earbud 104 has been docked based on whether the base station and earbud connectors have been electrically connected or not. In embodiments, the base station runs a routine for the determination periodically and repeatedly while the sound is being played on the earbud 104. In other embodiments, the base station 104 does not run such determination repeatedly or periodically and rather make the determination in response to a signal that is provided by the wireless earbud 104 when docking occurs.

At block 1206, the personal wireless media station 100 ceases providing sound playback through the base station speaker in response to determination that the earbud 104 has been docked to the base station 102. At block 1208, the personal wireless media station 100 begins providing sound playback through the earbud speaker immediately after or substantially simultaneously with stopping to play on the earbud 104. Here, immediately after or substantially simultaneously means within 0.03, 0.05, 0.08, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0 seconds from stoppage of playing sound on the earbud 104 or from determination that the earbud 104 has been docked.

As discussed above, there may be situations when the user may want to have a voice call or listen to music privately using the wireless earbud 104. In such situations, the user can simply unplug the wireless earbud 104 from the base station 102, and the sound data received from the primary device 200 automatically begins to be played back via the speaker on the wireless earbud 104 without the user having to activate the wireless earbud 104 or press any button(s).

In the method 1200, one or more of the blocks shown in FIG. 12 may be removed (e.g., not performed) and/or the order in which the method is performed may be switched. In some embodiments, additional blocks may be added to the method 1200. For example, in some embodiments, block 1204 may be omitted, and the sound playback may be automatically provided via the primary speaker. In some of such embodiments, the circuitry is configured such that the sound playback is automatically provided via the base station speaker if the wireless earbud 104 is docked and via the earbud speaker if the wireless earbud 104 is undocked. Thus, the embodiments of the present disclosure are not limited to or by the example shown in FIG. 12, and other variations may be implemented without departing from the spirit of this disclosure.

Pairing with Primary Device

In some embodiments, the base station 102 and the wireless earbud 104 are separately and individually paired with the primary device 200 for communication. In some other embodiments, the base station 102 is solely paired with the primary device 200 (e.g., the wireless earbud 104 is not paired with the primary device 200) and relays the data received from the primary device 200 to the wireless earbud 104. In some other embodiments, the wireless earbud 104 is solely paired with the primary device 200 (e.g., the base station 102 is not paired with the primary device 200) and relays the data received from the primary device 200 to the base station 102. In some of such embodiments, the relayed data is limited to audio data.

Exclusive Pairing Between Primary Device and Base Station

In some embodiments, the base station 102 is solely paired with the primary device 200, with no other device paired with the primary device 200. If the wireless earbud 104 (or any other device) was paired with the primary device 200 prior to the pairing of the base station 102 and the primary device 200, the pairing between the wireless earbud 104 and the primary device 200 (and any other pairings) would be terminated upon the pairing of the base station 102 and the primary device 200.

Exclusive Pairing Between Primary Device and Earbud

In some embodiments, the wireless earbud 104 is solely paired with the primary device 200, with no other device paired with the primary device 200. If the base station 102 (or any other device) was paired with the primary device 200 prior to the pairing of the wireless earbud 104 and the primary device 200, the pairing between the base station 102 and the primary device 200 (and any other pairings) would be terminated upon the pairing of the wireless earbud 104 and the primary device 200.

Primary and Secondary Paired Devices

In some embodiments, the primary device 200 designates the wireless earbud 104 as the primary paired device and the base station 102 as the secondary paired device. In other embodiments, the primary device 200 designates the base station 102 as the primary paired device and the wireless earbud 104 as the secondary paired device Adjusting Volume Using Volume Control Buttons While playing sound on the personal media player 100, the volume control buttons adjust volume of playing sound on either of the base station 102 and earbud 104. When the earbud 104 is docked to the base station 102, and sound is being played on the base station 102, the personal media player 100 is programmed to adjust volume of the speaker of the base station 102 by pressing volume control buttons. On the other hand, when the earbud 104 is undocked from the base station 102, and sound is being played on the earbud 104, the personal media player 100 is programmed to adjust volume of the speaker of the earbud 104 by pressing volume control buttons.

Adjusting Scrolling Speed

If the volume control buttons are activated while content is being displayed on the display surface 106 in scrolling display mode, the scrolling speed is adjusted.

Displaying Previous or Next Page

If the volume control buttons are activated while content is being displayed in page display mode, the next or previous page of the content (e.g., text or email) is displayed. For example, if the (+) button is pressed while an email is being displayed in page display mode, the next page/portion of the email is displayed, and if the (−) button is pressed while an email is being displayed in page display mode, the previous page/portion of the email is displayed.

Silent Mode

For example, upon detecting that the (−) volume button is pressed for a threshold period of time (e.g., 1 second, 2 seconds, 3 seconds, or any other duration), silent mode may be activated, and upon detecting that the (+) volume button is pressed for a threshold period of time (e.g., 1 second, 2 seconds, 3 seconds, or any other duration), silent mode may be deactivated (i.e., normal mode is activated). In silent mode, the speaker of the base station 102 may be disabled. Alternatively, in silent mode, both the speaker of the base station 102 and the LED light indicator of the base station 102 may be disabled.

Displaying Previous or Next Message

Upon detecting that the volume control button is pressed within a threshold time period after being pressed, the personal wireless media station 100 may cause the next text or email or the previous text or email to be displayed on the display surface 106. For example, upon detecting that the (−) volume button is pressed within a threshold time period (e.g., 0.5 seconds, 1 second, or any other duration) after being pressed, the personal wireless media station 100 may cause the previous text or email to be displayed on the display surface 106, and upon detecting that the (+) volume button is pressed within a threshold time period (e.g., 0.5 seconds, 1 second, or any other duration) after being pressed, the personal wireless media station 100 may cause the next text or email to be displayed on the display surface 106.

Voice Commands Using Function Control Button

Voice commands or voice-controlled interface (e.g., Siri) may be activated when the function control button is pressed and held for a threshold period of time (e.g., 1 second, 2 seconds, 3 seconds, or any other duration). In some embodiments, if such voice commands or voice-controlled interface is disabled or not available, the most recent phone number in the call history may be dialed when the function control button is pressed and held for a threshold period of time (e.g., 1 second, 2 seconds, 3 seconds, or any other duration). In other embodiments, a user-defined task is performed instead of dialing the most recent phone number in the call history.

Display Unread Text and Email Using Function Control Button

When there is an unread text or email, upon detecting that the function control button is pressed, the personal wireless media station 100 causes the unread text or email to be displayed on the display surface 106. After the text or email is displayed, if the function control button is pressed and there is no additional unread text or email, the personal wireless media station 100 may turn off the display surface 106. If there are additional unread texts and/or emails, upon detecting that the function control button is pressed again, the personal wireless media station 100 causes the next unread text or email to be displayed on the display surface 106.

Answer or Terminate Voice Calls Using Function Control Button

When there is an incoming voice call, upon detecting that the function control button is pressed, the personal wireless media station 100 causes the call incoming call to be answered. When there is an active voice call, upon detecting that the function control button is pressed, the personal wireless media station 100 causes the active voice call to be terminated.

Call Waiting Using Function Control Button

During an active voice call, if another incoming call is received, upon detecting that the function control button is pressed and held for a threshold period of time, the personal wireless media station 100 causes call waiting to be activated (e.g., the currently active voice call is placed on hold and the incoming voice call is answered). If the second call is terminated, the first call that was put on hold is automatically resumed. Upon detecting that the function control button is pressed and held for a threshold period of time while the second call is active and the first call is placed on hold, the personal wireless media station 100 causes the second call to be placed on hold and the first call to be resumed.

Splitting of Text/Image Data and Audio Data

In some embodiments, the primary device 200 splits text/image data from audio data and sends text/images data to the base station 102 and the audio data to the wireless earbud 104 such that the base station 102 displays text and images and the wireless earbud 104 plays audio. In other embodiments, the primary device 200 sends text/image and audio data to the base station 102 and only audio data to the wireless earbud 104 such that the base station 102 displays text and images and the wireless earbud 104 plays audio, in which the base station 102 also has the ability to play the audio data.

Operations: Earbud is Docked

In some embodiments, some or all components of the wireless earbud 104 are turned off or disabled when the wireless earbud 104 is docked to the base station 102. The battery of the wireless earbud 104 is charged when the wireless earbud 104 is docked to the base station 102.

Operation of Base Station Display when Earbud is Docked

When the wireless earbud 104 is docked to the base station 102, if an incoming call or an outgoing call is detected, the display surface 106 displays the caller/receiver data. When the wireless earbud 104 is docked to the base station 102, if a message (e.g., text, image, video, email message) is received, the display surface 106 displays the text/image associated with the received message. When the wireless earbud 104 is docked to the base station 102, when sound/music is being played, the display surface 106 displays data associated with the sound/music currently being played.

Operation of Base Station Microphone when Earbud is Docked

Upon detecting that the wireless earbud 104 is docked to the base station 102, the personal wireless media station 100 causes the microphone on the base station 102 to be automatically activated, if it has not been active or turned on.

Operation of Base Station Speaker when Earbud is Docked

Upon detecting that the wireless earbud 104 is docked to the base station 102, the personal wireless media station 100 causes the speaker on the base station 102 to be automatically activated if it has not been active or turned on.

Operation of Earbud Microphone when Earbud is Docked

Upon detecting that the wireless earbud 104 is docked to the base station 102, the personal wireless media station 100 causes the microphone on the wireless earbud 104 to be automatically disabled if it has been active or turned on. While the wireless earbud 104 is docked to the base station 102, the microphone on the wireless earbud 104 remains disabled. In some embodiments, the wireless earbud 104 does not have a microphone.

Operation of Earbud Speaker when Earbud is Docked

Upon detecting that the wireless earbud 104 is docked to the base station 102, the personal wireless media station 100 causes the speaker on the wireless earbud 104 to be automatically disabled if it has been active or turned on. While the wireless earbud 104 is docked to the base station 102, the speaker on the wireless earbud 104 remains disabled.

Operations: Earbud is Undocked

In some embodiments, some or all components of the wireless earbud 104 are turned on or enabled when the wireless earbud 104 is undocked to the base station 102.

Operation of Base Station Display when Earbud is Undocked

When the wireless earbud 104 is undocked from the base station 102, if an incoming call or an outgoing call is detected, the display surface 106 displays the caller/receiver data. When the wireless earbud 104 is undocked from the base station 102, if a message (e.g., text, image, video, email message) is received, the display surface 106 displays the text/image associated with the received message. When the wireless earbud 104 is undocked from the base station 102, when sound/music is being played, the display surface 106 displays data associated with the sound/music currently being played. In some embodiments, the operation of the base station display when and while the wireless earbud 104 is undocked from the base station 102 is identical to the operation of the operation of the base station display when and while the wireless earbud 104 is docked to the base station 102.

Operation of Base Station Microphone when Earbud is Undocked

Upon detecting that the wireless earbud 104 is undocked from the base station 102, the personal wireless media station 100 causes the microphone on the base station 102 to be automatically disabled. In some embodiments, if the wireless earbud 104 does not have a microphone, the microphone on the base station 102 remains activated or enabled even after the wireless earbud 104 is undocked from the base station 102.

Operation of Base Station Speaker when Earbud is Undocked

Upon detecting that the wireless earbud 104 is undocked from the base station 102, the personal wireless media station 100 causes the speaker on the base station 102 to be automatically disabled. In some embodiment, upon detecting a user request to enable the base station speaker, the personal wireless media station 100 causes the base station speaker causes to be enabled or remain enabled even when the wireless earbud 104 is undocked from the base station 102.

Operation of Earbud Microphone when Earbud is Undocked

Upon detecting that the wireless earbud 104 is undocked from the base station 102, the personal wireless media station 100 causes the microphone on the wireless earbud 104 to be automatically activated or enabled. In some embodiment, upon detecting a user request to disable the earbud microphone, the personal wireless media station 100 causes the earbud microphone to be disabled or remain disabled even when the wireless earbud 104 is undocked from the base station 102

Operation of Earbud Speaker when Earbud is Undocked

Upon detecting that the wireless earbud 104 is undocked from the base station 102, the personal wireless media station 100 causes the speaker on the wireless earbud 104 to be automatically activated or enabled.

No Microphone in Earbud

In some embodiments in which the wireless earbud 104 does not have a microphone, upon detecting that a voice call is initiated, the personal wireless media station 100 automatically causes the microphone of the base station 102 to become active to pick up the user's voice even while the wireless earbud 104 is undocked from the base station 102.

Microphone in Earbud

In some embodiments in which the wireless earbud 104 includes a microphone, upon detecting that a voice call is initiated, the personal wireless media station 100 automatically causes the microphone of the wireless earbud 104 to become active to pick up the user's voice even while the earbud is undocked from the base station 102.

Communication between Primary Device and Personal Wireless Media Station

In one embodiment, the communications modules 502 and 514 each communicate with the primary device 200 but not with each other. In another embodiment, the communications modules 502 and 514 communicate with each other but only the communications module 502, and not the communications module 514, communicates with the primary device 200. In yet another embodiment, the communications modules 502 and 514 communicate with each other but only the communications module 514, and not the communications module 502, communicates with the primary device 200. In yet another embodiment, the communications modules 502 and 514 each communicate with the primary device 200 and also communicate with each other.

Only Base Station Communicates with Primary Device

In some embodiments, the communications modules 502 and 514 communicate with each other but only the communications module 502, and not the communications module 514, communicates with the primary device 200. In some of such embodiments, the communication between the communications modules 502 and 514 is one way (e.g., data is transmitted from the communications module 502 to the communications module 514). In other such embodiments, the communication between the communications modules 502 and 514 is two way (e.g., data is transmitted from the communications module 502 to the communications module 514 and also transmitted from the communications module 514 to the communications module 502).

Only Earbud Communicates with Primary Device

In some embodiments, the communications modules 502 and 514 communicate with each other but only the communications module 514, and not the communications module 502, communicates with the primary device 200. In some of such embodiments, the communication between the communications modules 502 and 514 is one way (e.g., data is transmitted from the communications module 514 to the communications module 502). In other such embodiments, the communication between the communications modules 502 and 514 is two way (e.g., data is transmitted from the communications module 502 to the communications module 514 and also transmitted from the communications module 514 to the communications module 502).

Two-Way Wireless Module on Base Station

In some embodiments, the communications module 502 is a two-way wireless module. In such embodiments, the communications module 502 receives data from the primary device 200 as well as transmits data to the primary device 200. In some embodiments, the communications module 502 receives data from the wireless earbud 104 as well as transmits data to the wireless earbud 104. The communications module 502 may use the Bluetooth technology. However, the communications module 502 is not limited as such and may be implemented using any wireless communications standards currently available or developed in the future. For example, the data received from the primary device 200 and/or the wireless earbud 104 may include call data, caller data, sound data, text, voice, or video message data, and any other data that the user can directly (e.g., without the help of the personal wireless media station 100) access from the primary device 200. The data transmitted to the primary device 200 and/or the wireless earbud 104 may include user input data, recorded sound data, captured image data, and any other data that the user can directly (e.g., without the help of the personal wireless media station 100) provide to the primary device 200.

One-Way Wireless Module on Base Station

In some embodiments, the base station 102 includes one or more one-way wireless modules. In such embodiments, such wireless modules transmit data to the primary device 200 and/or the wireless earbud 104 (e.g., to the communications module 514) but does not receive any data from the primary device 200 and/or the wireless earbud 104 (e.g., from the communications module 514). Such wireless modules may use the Bluetooth technology. However, such wireless modules are not limited as such and may be implemented using any wireless communications standards currently available or developed in the future. For example, the data transmitted to the wireless earbud 104 may include sound data or any other data that the user can directly (e.g., without the help of the wireless earbud 104) access from the base station 102 of the personal wireless media station 100. In some embodiments, the communications module 502 is a one-way wireless module that is configured to only transmit data. In some embodiments, the communications module 502 is a one-way wireless module that is configured to only receive data.

Two-Way Wireless Module on Earbud

In some embodiments, the communications module 514 is a two-way wireless module. In such embodiments, the communications module 514 receives data from the primary device 200 as well as transmits data to the primary device 200. In some embodiments, the communications module 514 receives data from the base station 102 as well as transmits data to the base station 102. The communications module 502 may use the Bluetooth technology. However, the communications module 514 is not limited as such and may be implemented using any wireless communications standards currently available or developed in the future. For example, the data received from the primary device 200 and/or the base station 102 may include call data, caller data, sound data, text, voice, or video message data, and any other data that the user can directly (e.g., without the help of the personal wireless media station 100) access from the primary device 200. In some embodiments, the received data is limited to audio data. The data transmitted to the primary device 200 and/or the base station 102 may include user input data, recorded sound data, captured image data, and any other data that the user can directly (e.g., without the help of the personal wireless media station 100) provide to the primary device 200. In some embodiments, the transmitted data is limited to audio data.

One-Way Wireless Module on Earbud

In some embodiments, the wireless earbud 104 includes one or more one-way wireless modules. In such embodiments, such wireless modules transmit data to the primary device 200 and/or the base station 102 (e.g., to the communications module 502) but does not receive any data from the primary device 200 and/or the base station 102 (e.g., from the communications module 502). Such wireless modules may use the Bluetooth technology. However, such wireless modules are not limited as such and may be implemented using any wireless communications standards currently available or developed in the future. For example, the data transmitted to the base station 102 may include sound data or any other data that the user can directly (e.g., without the help of the wireless earbud 104) access from the base station 102 of the personal wireless media station 100. In some embodiments, the communications module 514 is a one-way wireless module that is configured to only transmit data. In some embodiments, the communications module 514 is a one-way wireless module that is configured to only receive data.

Detecting Docking and Undocking of Earbud

The base station connector may include a switch that is used for detecting whether the wireless earbud 104 has been docked to the base station 102. For example, such a switch may be switched on when an electrical connection is established between the base station and earbud connectors. Alternatively or additionally, the base station connector may include circuitry that measures the impedance and/or other characteristics of the connector (e.g., the earbud connector) that plugs into the base station connector. The base station connector may provide any measured data to the processor included in the personal wireless media station 100. Based on the state of the switch and/or the measured data, the processor 506 may provide the sound playback to either the base station speaker or the earbud speaker. For example, if the processor 506 determines that the switch is in a first state (or the measured data exceeds a threshold level), the processor 506 may cause the sound playback to be provided via the base station speaker, and if the processor 506 determines that the switch is in a second state different from the first state (or the measured data does not exceed the threshold level), the processor 506 may cause the sound playback to be provided via the earbud speaker.

When to Check for Docking and Undocking of Earbud

In some embodiments, the processor 506 may periodically determine whether the base station and earbud connectors are electrically connected. In some embodiments, upon docking or undocking of the wireless earbud 104, a signal or instruction is sent to the processor 506, causing the processor 506 to determine whether the base station and earbud connectors are electrically connected. In some embodiments, the processor 506 does not check at all whether the base station and earbud connectors are electrically connected, and the sound playback is automatically redirected, based on the circuitry of the personal wireless media station 100, upon docking and undocking of the wireless earbud 104.

Other Types of Connectors

In some embodiments, the base station pogo connectors and the earbud pogo connectors described herein may be replaced with other types of connectors. For example, the base station pogo connectors and the earbud pogo connectors may be replaced with a female 3.5 mm earphone socket and a male 3.5 mm earphone plug, respectively. As another example, any types of connectors that allow charging and detection of docked and undocked states of the wireless earbud 104 may be used.

Incoming Text and Email Messages

The personal wireless media station 100 may allow the user to read texts and emails via the display surface 106, without having to maneuver the primary device 200. In some embodiments, when a new text or email arrives, data regarding the text or email is transmitted to the personal wireless media station 100 by the primary device 200. Based on the data received from the primary device 200, the personal wireless media station 100 may cause at least a portion of the content of the text or email on the display surface 106. For example, the display surface 106 may initially display a notification that a new text or email has arrived, and upon detecting a user input indicating that the user wishes to view the content of the text or email, display the beginning portion of the text or email.

Scrolling

Once the beginning portion of the text or email is displayed on the display surface 106, the personal wireless media station 100 may continue to display the remaining portion of the text or email by scrolling the content across the display surface 106 (e.g., move the text displayed on the display surface 106 to the left at a specified speed, with the displayed text disappearing to the left end of the display surface 106 and new text appearing from the right end of the display surface 106).

Jumping to Next Text or Email

The personal wireless media station 100 may cause the next text or email to be displayed if additional unopened texts or emails exist. For example, while a text or email is being displayed on the display surface 106, if the user provides a user input indicating that the user wishes to view the next text or email, the personal wireless media station 100 causes the beginning portion of the next text or email to be displayed on the display surface 106.

Display Scrolling Speed

The user may control the speed at which the text is scrolled across the display surface 106, for example, by using the volume up and volume down buttons. Other buttons may be used to control the scrolling speed. For example, if the user slides his finger across the touch-sensitive button in one direction, the personal wireless media station 100 increases the scrolling speed, and if the user slides his finger across the touch-sensitive button in the other direction, the personal wireless media station 100 decreases the scrolling speed.

Page Turning

In some embodiments, the personal wireless media station 100, after causing the beginning portion of the text or email on the display surface 106, awaits a user input indicating that the user wishes to view the next portion of the text or email. When the user provides such an input (e.g., by activating a button on the personal wireless media station 100), the personal wireless media station 100 causes the next portion of the text or email to be displayed on the display surface 106.

Display Text Size

The user may control the size of the text displayed on the display surface 106, for example, by using the volume up and volume down buttons. Other buttons or combinations of buttons may be used to control the text size (e.g., function control button+volume up increases the text size and function control button+volume down decreases the text size).

Incoming Telephone Call

In some embodiments, when a call is received on the primary device 200, the data regarding the call (e.g., data indicating who the caller is) is transmitted to the personal wireless media station 100, and based on the received data, the personal wireless media station 100 causes caller data to be displayed on the display surface 106. Additionally, the personal wireless media station 100 may provide an indication that a call is incoming via the base station speaker (or the earbud speaker if the wireless earbud 104 is undocked) by playing a sound, via the LED indicator by providing a blinking signal, or by vibrating the base station 102.

Accepting an Incoming Telephone Call

While a call is incoming, the user may provide a user input to the personal wireless media station 100 to take the call. For example, the user may press the function control button to indicate that he wishes to take the call, and in response, the base station 102 may transmit the indication to the primary device 200 and cause the primary device 200 to take the call. During the call, the sound data is transmitted from the primary device 200 to the personal wireless media station 100 and the voice data captured by the base station microphone (or the earbud microphone if the wireless earbud 104 is undocked) is transmitted to the primary device 200. In some embodiments, if the wireless earbud 104 is undocked from the base station 102, the personal wireless media station 100 may further relay the sound data to the wireless earbud 104 to be played via the wireless earbud 104, and relay the captured voice data from the wireless earbud 104 to the primary device 200. In other embodiments, the wireless earbud 104 exchanges sound data and captured voice data with the primary device 200 directly without going through the base station 102.

Black Box Feature

The personal wireless media station 100 may include a black box feature. For example, the personal wireless media station 100 may capture audio data or image data upon user activation of the black box feature. In some embodiments, the personal wireless media station 100 records audio data captured by the microphone in the background and/or records image or video data captured by a camera module (not shown) in the background. The recorded data may be transmitted to the primary device 200, and may be discarded after a specified period of time or after a specified amount of new data has been collected.

Charging

The personal wireless media station 100 may charge the wireless earbud 104 while the wireless earbud 104 is plugged into the base station 102. The base station 102 may be charged via a charge port (not shown in FIG. 3) using an external charging cable. When the wireless earbud 104 is plugged into the base station 102 for charging, the wireless communication between the base station 102 of the personal wireless media station 100 and the wireless earbud 104 may be turned off.

No Storage

The personal wireless media station 100 may not have any storage (e.g., nonvolatile memory), and any data output by the personal wireless media station 100 may be stored on volatile memory. For example, the personal wireless media station 100 may only stream sound without permanently storing any audio data on the personal wireless media station 100. In some embodiments, the audio data transmitted from the primary device 200 to the base station 102 may further be transmitted and played via the wireless earbud 104. In other embodiments, the audio data transmitted from the primary device 200 to the wireless earbud 104 may further be transmitted and played via the base station 102. In other embodiments, the audio data transmitted from the primary device 200 to the wireless earbud 104 is played directly by the wireless earbud 104.

Mechanical Clip or Necklace

As shown in FIG. 4, the base station 102 includes a clip 116 that may be used to attach the personal wireless media station 100 to the user's clothing (e.g., shirt) or accessory (e.g., hat). The clip 116 may be integrated with the body and may include a spring plate that faces the rear surface of the body of the base station 102. In some embodiments, instead of or in addition to the clip 116, the base station 102 includes a necklace that may be used to hang the base station 102 from the user's neck.

Watch

The personal wireless media station 100 may include a watch feature. For example, the display surface 106 may display the current time when the display surface 106 is idle, when the display surface 106 is not displaying data received from the primary device 200, or when the user presses one of the buttons of the personal wireless media station 100. The personal wireless media station 100 may further include an alarm function that plays an alarm indication at a specified time via a speaker, an LED indicator, and/or the display surface 106. In some embodiments, the user device 106 may transmit such an alarm indication to the personal wireless media station 100 at the specified time. In response to receiving the alarm indication, the personal wireless media station 100 causes the alarm indication to be output to the user via the speaker, the LED indicator, and/or the display surface 106.

Camera

The personal wireless media station 100 may include a camera feature. The personal wireless media station 100 may capture images via a camera module, and the personal wireless media station 100 may transmit the captured images to the primary device 200 and cause the captured images to be stored in the primary device 200.

Activating and Deactivating Voice Command Feature

The personal wireless media station 100 may be configured to activate or deactivate the voice command feature of the primary device 200 based on a user input to the personal wireless media station 100. For example, the user may press a button provided on the personal wireless media station 100, and the button may be configured to generate a command to the primary device 200 wirelessly connected to the personal wireless media station 100 to turn on or turn off the voice command feature of the primary device 200. Other user inputs to the personal wireless media station 100 may be configured to activate or deactivate other features of the primary device 200.

Two-Way Communication with Wireless Earbud

The wireless earbud 104 may be paired with the base station 102 of the personal wireless media station 100 using a two-way wired or wireless communication.

Recording Telephone Calls

In some embodiments, the personal wireless media station 100 may be configured to record telephone calls. The recording may be initiated on the personal wireless media station 100 or the mobile application running on the primary device 200. The recording may be stored in cloud storage assigned to the registered user of the primary device 200 or the personal wireless media station 100. For example, the user may register his or her personal wireless media station 100 online (e.g., on the provider associated with the personal wireless media station 100 or any other provider of cloud storage services), and cloud storage may be provided to the user for use. The recording may have a file name including the name or the telephone number of the calling party initiating the telephone call.

Finder Function

In some embodiments, the mobile application 202 is configured to provide a signal or instruction to the personal wireless media station 100 to turn off all functions except for the finder function that allows the user to locate the personal wireless media station 100. When the finder function is activated, the personal wireless media station 100 may beep and the LED light indicator may blink.

Display Current Date/Time and Battery Life

In some embodiments, upon detecting that the function control button 110 is pressed, the personal wireless media station 100 displays the current date/time and/or the battery life of the personal wireless media station 100. In other embodiments, upon detecting that the function control button 110 is pressed, the personal wireless media station 100 displays the current date/time and/or the battery life of the personal wireless media station 100 only when there is no unread text and while no phone call/incoming phone ringing.

Automatically Turn Off Bluetooth while Charging

In some embodiments, upon detecting that battery charging is initiated or active, the personal wireless media station 100 automatically turns off Bluetooth (or other wireless connection).

New Earbud Pairing

In some embodiments, upon receiving a user request to pair a new earbud, the mobile application 202 initiates pairing with the new earbud using the user-provided serial number of the new earbud.

Bluetooth Priority

In some embodiments, when multiple Bluetooth devices are available, the personal wireless media station 100 takes priority and connects to the primary device 200. For example, the mobile application 202 may configure the Bluetooth settings on the primary device 200 such that the personal wireless media station 100 has the highest priority.

Water Resistance

In some embodiments, the base station 102 and/or the wireless earbud 104 are water resistant. For example, one or both of the base station 102 and the wireless earbud 104 have a rating of IPX 4 or higher.

Automatic Picture Taking

In some embodiments, the base station 102 periodically takes pictures and store them in the base station 102 and/or transmit them to the primary device 200. In other embodiments, the base station 102 periodically takes pictures and store them in the base station 102 and/or transmit them to the primary device 200 only while the base station 102 is not being charged.

Control Settings

Controllable settings may include one or more of earbud volume, text scrolling speed, text auto display on/off, display surface brightness, microphone input volume, speaker output volume, Siri or voice command on/off, LED light indicator on/off, automatic Bluetooth on/off, automatic sound recording on/off, automatic photo taking on/off, voice call recording on/off, and automatic file name generation on/off.

Mobile App: Types

The mobile application 202 may have multiple versions: a free version, and a paid version that includes all the functionalities of the free version plus cloud storage. The paid app may include auto-naming feature for recorded data, where the automatically generated names include the caller IDs, etc.

Ringtones

The wireless earbud 104 is capable of playing ringtones or ringtone-equivalents and media including music or any combination thereof. The base station 102 is capable of displaying text and images and playing ringtones or ringtone-equivalents and media including music and video or any combination thereof.

Other Views and Embodiments of Personal Wireless Media Station

Figure 14A:
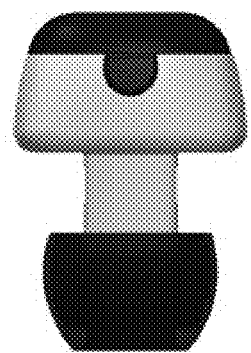
FIGS. 14A, 14B, 15A and 15B illustrate different views of a wireless earbud, according to an example embodiment.
Figure 14B:
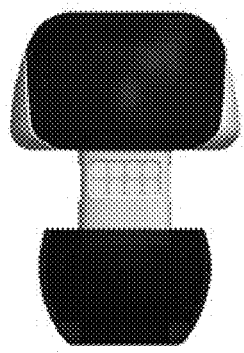
Figure 15A:
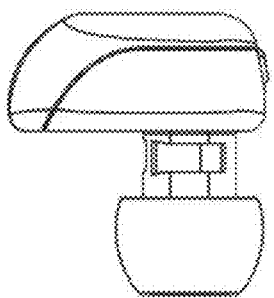
Figure 15B:
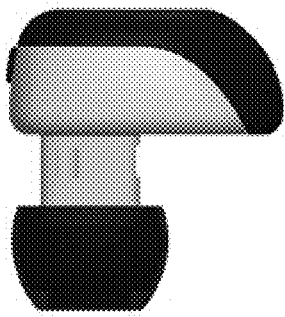
Figure 16:
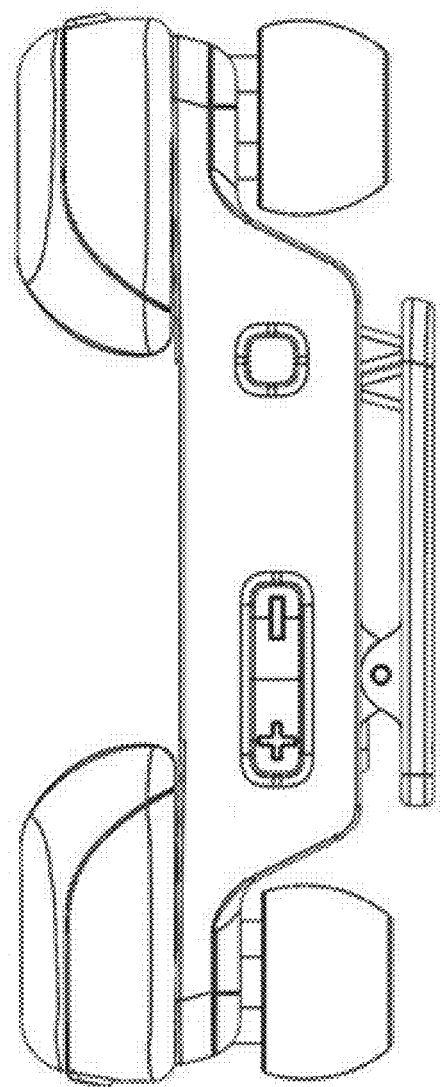
FIG. 16 illustrates a personal wireless media station having multiple wireless earbuds docked to the base station, according to an example embodiment.
Figure 19A:
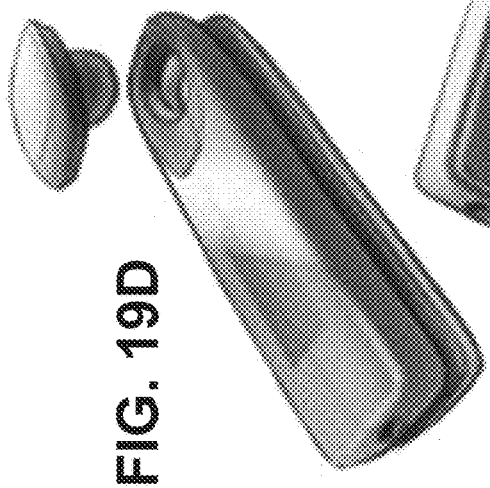
FIGS. 19A-19E illustrate a personal wireless media station having an alternative docking mechanism, according to an example embodiment.
Figure 19B:
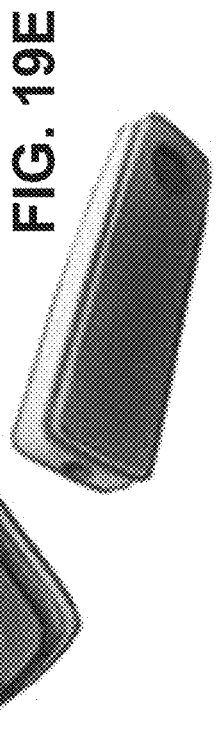
Figure 19C:
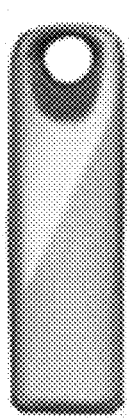
Figure 19D:
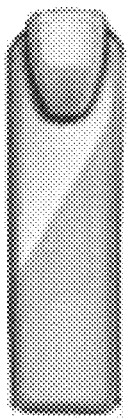
Figure 19E:
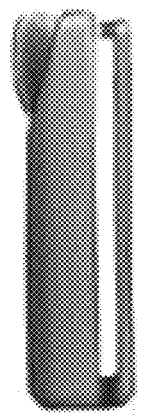

FIGS. 9-22 illustrate other views and embodiments of the personal wireless media station 100. FIGS. 9A-9F illustrate different views of the personal wireless media station 100 in the docked position, according to an example embodiment. FIGS. 10A-10F illustrate different views of the base station 102, according to an example embodiment. FIGS. 11A and 11B illustrate different views of the personal wireless media station 100 in the docked position, according to an example embodiment. FIGS. 12A and 12B illustrate different views of the base station 102, according to an example embodiment. FIGS. 13A-13F illustrate different views of the wireless earbud 104, according to an example embodiment. FIGS. 14 and 15 illustrate different views of the wireless earbud 104, according to an example embodiment. FIG. 16 illustrates a personal wireless media station 100 having multiple wireless earbuds docked to the base station, according to an example embodiment. FIGS. 17A-17D illustrate a personal wireless media station 100 having an alternative docking mechanism, according to an example embodiment. FIGS. 18A-18D illustrate a personal wireless media station 100 having an alternative docking mechanism, according to an example embodiment. FIGS. 19A-19E illustrate a personal wireless media station 100 having an alternative docking mechanism, according to an example embodiment. FIGS. 20A-20D illustrate a personal wireless media station 100 having an alternative docking mechanism, according to an example embodiment. FIGS. 21A-21C illustrate a personal wireless media station 100 having an alternative docking mechanism, according to an example embodiment. FIGS. 22A-22C illustrate a personal wireless media station 100 having an alternative docking mechanism, according to an example embodiment.

Other Mechanical Embodiments

In addition to the examples described with reference to FIGS. 1-4, various example embodiments related to the operation of the personal wireless media station 100 are described below.

Microphone on Wireless Earbud

In some embodiments, the wireless earbud 104 includes a microphone. Additionally, in some of such embodiments, the base station 102 does not include a microphone.

No Speaker on Base Station

In some embodiments, the base station 102 does not include a speaker. In some of such embodiments, upon detecting the undocking of the wireless earbud 104, the personal wireless media station 100 may cause an incoming voice call to be picked up, cause sound/music playback to be enabled, and/or cause other actions to be performed.

Multiple Wireless Earbuds

As illustrated in FIG. 16, one or more additional earbuds can be docked on the base station 102 with additional sets of docking arms, connectors, and arm protrusions (locking device). Each additional earbud may include waist recessions corresponding to the arm protrusions.

Additional Docking Embodiments

Following are additional embodiments of the invention providing docking (engaging)/undocking (disengaging) between the base station 102 and the wireless earbud 104 in which the base station 102 and the wireless earbud 104 become mechanically and electrically coupled when the wireless earbud 104 is fully docked (engaged).

Additional Docking Embodiment #1

As illustrated in FIGS. 17A-17D, in some embodiments, the base station 102 has a sliding groove in either the y-axis direction or the z-axis direction (as defined herein). The wireless earbud 104 has a corresponding rail that fits snugly into the sliding groove on the base station 102. When the rail of the wireless earbud 104 has fully slid into the sliding groove on the base station 102, the base station 102 and the wireless earbud 104 are mechanically locked and electrically connected.

Additional Docking Embodiment #2

As illustrated in FIGS. 18A-18D, in some embodiments, the base station 102 has a ring-like (donut-like) hole in either the y-axis direction or the z-axis direction (as defined herein). The wireless earbud 104 has a corresponding protruding ball-like ear portion that can be inserted into the hole in the base station 102. In one embodiment, the ear portion is inserted into the hole from the clip side to the display side of the base station 102. As illustrated in FIGS. 19A-19E, in another embodiment, the ear portion is inserted into the hole from the display side to the clip side of the base station 102. When the ear portion of the wireless earbud 104 is fully inserted into the hole of the base station 102, the head portion of the wireless earbud 104 mechanically snaps into the portion of the base station 102 surrounding the hole and facing the wireless earbud 104. When the ear portion of the wireless earbud 104 is fully inserted into the hole of the base station 102, the base station 102 and the wireless earbud 104 are mechanically locked and an electric connection is made between the base station 102 and the wireless earbud 104.

Additional Docking Embodiment #3

As illustrated in FIGS. 20A-20D, in some embodiments, the base station 102 has a slit configured to receive the head portion of the wireless earbud 104, in which the head portion has a configuration to slide along the x-z plane and fit snugly in the slit. When the head portion of the wireless earbud 104 is fully inserted into the slit of the base station 102, the base station 102 and the wireless earbud 104 are mechanically locked and an electric connection is made between the base station 102 and the wireless earbud 104.

Additional Docking Embodiment #4

As illustrated in FIGS. 21A-21C, in some embodiments, the base station 102 has a USB-male-like-plug configured for insertion along the x-axis (as defined herein). The wireless earbud 104 has a USB-female-like socket ear portion accepts the plug provided on the base station 102 in the x-axis direction. When the plug portion of the base station 102 is fully inserted into the socket portion of the wireless earbud 104, the base station 102 and the wireless earbud 104 are mechanically locked and an electric connection is made between the base station 102 and the wireless earbud 104. Alternatively, the wireless earbud 104 may include a plug portion, and the base station 102 may include a corresponding socket portion.

Additional Docking Embodiment #5

As illustrated in FIGS. 22A-22C, in some embodiments, the wireless earbud 104 has a hook-like insertion piece located on the earbud's head portion. The base station 102 has a socket (cavity) that allows for insertion of the earbud's hook-like insertion piece along a first axis and sliding along second axis perpendicular to the first axis. When the insertion piece of the wireless earbud 104 is fully inserted and slid into the base station's socket, the insertion piece mechanically snaps into the locking mechanism located in the sockets of the base station 102. When the insertion piece of the wireless earbud 104 is fully inserted and slid into the base station's socket, the base station 102 and the wireless earbud 104 are mechanically locked and an electric connection is made between the base station 102 and the wireless earbud 104.

Other Considerations

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, and that various changes in form and details may be made without departing from the spirit and scope of the present disclosure as set forth in the following claims.

What is claimed is:

1. A mobile system comprising:
a base station comprising a connection hole, a user input button, at least one processor, at least one memory, and circuitry; and
a wireless earbud configured for plugging into the connection hole of the base station to form an integrated body with the base station,
wherein the system is capable of wirelessly pairing with a smartphone for the wireless earbud to receive audio data originated from the smartphone,
wherein, in response to pressing of the user input button, the at least one processor is configured to execute computer program instructions stored in the at least one memory to initiate processing for the wireless pairing with the smartphone such that the wireless earbud receives audio data originated from the smartphone and plays audio using the audio data from the smartphone,
wherein, in response to plugging the wireless earbud into the connection hole, the at least one processor is configured to execute computer program instructions stored in the at least one memory to initiate charging of a battery of the wireless earbud,
wherein, when the wireless earbud is plugged into the connection hole of the base station, the wireless earbud is configured to electrically connect with the circuitry of the base station and further configured to performing wired data communication with the base station.

2. The system of claim 1, wherein the system is configured such that there is no data transmission wirelessly between the wireless earbud and the base station.

3. The system of claim 1, further comprising a mechanical clip integrated with the base station and configured for clipping a person's clothing, wherein the system is configured such that there is no data transmission wirelessly between the wireless earbud and the base station.

4. The system of claim 1, wherein, when the wireless earbud is plugged into the connection hole, the system is configured such that the smartphone wirelessly communicates with at least one of the base station and the wireless earbud.

5. The system of claim 1, wherein the base station further comprises a wireless communication module configured to wirelessly communicate with at least one of the smartphone and the wireless earbud.

6. The system of claim 1, wherein the at least one processor is configured to determine whether the wireless earbud is plugged into the connection hole or unplugged out of the connection hole, wherein the system is configured such that there is no data transmission wirelessly between the wireless earbud and the base station.

7. The system of claim 1, wherein the base station further comprises a volume control button configured to control volume of the wireless earbud.

8. The system of claim 1, wherein the base station further comprises an information display.

9. The system of claim 1, wherein, while the wireless earbud is plugged in the connection hole of the base station, the circuitry of the base station is configured to obtain characteristics of the wireless earbud and send the characteristics to the at least one processor,
wherein the mobile system is configured to generate sound when a mobile application installed on the smartphone is searching for the mobile system while the wireless earbud is paired with the smartphone.

10. A mobile system comprising:
a mobile base station comprising a connection hole, a user input button, at least one processor, at least one memory, and circuitry; and
a wireless earbud configured for plugging into the connection hole of the mobile base station to form an integrated body with the mobile base station,
wherein, while the wireless earbud is plugged in the connection hole of the mobile base station, the wireless earbud is configured to electrically connect with the circuitry of the mobile base station and further configured to perform wired data communication with the mobile base station,
wherein, while the wireless earbud is plugged in the connection hole of the mobile base station, the circuitry of the mobile base station is configured to obtain characteristics of the wireless earbud and send the characteristics to the at least one processor,
wherein, while the wireless earbud is plugged in the connection hole of the mobile base station, the mobile base station is configured to charge a battery of the wireless earbud,
wherein the wireless earbud has wireless communication capability for wireless pairing with a smartphone to perform data communication with the smartphone,
wherein the mobile system is configured to generate sound when a mobile application installed on the smartphone is searching for the mobile system while the wireless earbud is paired with the smartphone,
wherein, in response to pressing of the user input button of the mobile base station, the at least one processor is configured to execute computer program instructions stored in the at least one memory to initiate processing for the wireless pairing.

11. The system of claim 10, further comprising a mechanical clip integrated with the mobile base station and configured for clipping a person's clothing, wherein the system is configured such that there is no data transmission wirelessly between the wireless earbud and the mobile base station.

12. The system of claim 10, wherein, when the wireless earbud is plugged into the connection hole, the system is configured such that the smartphone wirelessly communicates with at least one of the mobile base station and the wireless earbud.

13. The system of claim 10, wherein the mobile base station further comprises a wireless communication module configured to wirelessly communicate with at least one of the smartphone and the wireless earbud.

14. The system of claim 10, wherein the at least one processor is configured to determine whether the wireless earbud is plugged into the connection hole or unplugged out of the connection hole of the mobile base station, wherein the mobile base station is configured such that battery charging of the wireless earbud is performed while the wireless earbud is plugged in the connection hole of the mobile base station.

15. The system of claim 10, wherein the mobile base station further comprises a volume control button configured to control volume of the wireless earbud, wherein the system is configured such that there is no data transmission wirelessly between the wireless earbud and the mobile base station.

16. The system of claim 10, wherein the system is configured such that, in response to plugging into the connection hole of the mobile base station, the wireless earbud initiates wired data communication with the mobile base station, wherein the wireless earbud is further configured to initiate the wireless pairing in response to unplugging out of the connection hole of the mobile base station, wherein the system is configured such that, subsequent to unplugging out of the connection hole of the mobile base station, the wireless earbud generates sound using audio data from the smartphone without an additional action of a user to the wireless earbud.

17. The system of claim 10, wherein the system is configured to such that, in response to plugging into the connection hole of the mobile base station, the wireless earbud stops playing sound based on audio data from the smartphone, wherein the system is configured to provide a battery status to the smartphone such that a low battery warning is displayed on the smartphone.

18. The system of claim 10, wherein the mobile base station further comprises a communication module configured to interface data communication with at least one of the smartphone and the wireless earbud.

19. The system of claim 10, wherein, in response to unplugging the wireless earbud out of the connection hole, the system is configured to initiate processing for the wireless pairing with the smartphone.

20. The system of claim 10, wherein, in response to plugging the wireless earbud into the connection hole, the at least one processor is configured to execute computer program instructions stored in the at least one memory to initiate ceasing of the wireless pairing with the smartphone.

21. The system of claim 10, wherein the at least one processor is configured to execute computer program instructions stored in the at least one memory to turn off the wireless pairing while the wireless earbud is being charged.

22. The system of claim 10, wherein the mobile base station further comprises a communication module configured to interface data communication with at least one of the smartphone and the wireless earbud.

23. The system of claim 10, wherein the at least one processor is configured to execute computer program instructions stored in the at least one memory to turn off the wireless pairing while the wireless earbud is being charged, wherein, in response to plugging the wireless earbud into the connection hole, the at least one processor is configured to execute computer program instructions stored in the at least one memory to initiate ceasing of the wireless pairing with the smartphone.

24. The system of claim 10, wherein the mobile base station further comprises a communication module configured to interface data communication with at least one of the smartphone and the wireless earbud, wherein the at least one processor is configured to determine whether the wireless earbud is plugged into the connection hole or unplugged out of the connection hole.

25. The system of claim 10, wherein the at least one processor is configured to determine whether the wireless earbud is plugged into the connection hole or unplugged out of the connection hole, wherein, when the wireless earbud is plugged into the connection hole, the smartphone is configured to wirelessly communicate with at least one of the mobile base station and the wireless earbud.

26. The system of claim 10, wherein the mobile base station further comprises a communication module configured to interface data communication with at least one of the smartphone and the wireless earbud, wherein in response to pressing the user input button, the at least one processor is configured to execute computer program instructions stored in the at least one memory to process the wireless pairing with the smartphone.

27. The system of claim 10, wherein the mobile base station further comprises a communication module configured to interface data communication with at least one of the smartphone and the wireless earbud, wherein, when the wireless earbud is plugged into the connection hole, the system is configured such that the smartphone wirelessly communicates with at least one of the mobile base station and the wireless earbud.

28. The system of claim 10, wherein the at least one processor is configured to determine whether the wireless earbud is plugged into the connection hole or unplugged out of the connection hole, wherein the mobile base station further comprises a communication module configured to interface data communication with at least one of the smartphone and the wireless earbud, wherein, when the wireless earbud is plugged into the connection hole, the system is configured such that the smartphone wirelessly communicates with at least one of the mobile base station and the wireless earbud.

29. The system of claim 10, wherein the at least one processor is configured to determine whether the wireless earbud is plugged into the connection hole or unplugged out of the connection hole, wherein, in response to unplugging the wireless earbud out of the connection hole, the system is configured to initiate processing for the wireless pairing with the smartphone.

30. A mobile system comprising:
a smartphone comprising at least one mobile application installed thereon;
a mobile apparatus comprising a main body and a wireless earbud;
the main body comprising a connection hole, a user input button, at least one processor, at least one memory, and circuitry; and
the wireless earbud configured for plugging into the connection hole of the main body to form an integrated body with the main body,
wherein, while the wireless earbud is plugged in the connection hole of the main body, the wireless earbud is configured to electrically connect with the circuitry of the main body and further configured to perform wired data communication with the main body,
wherein, while the wireless earbud is plugged in the connection hole of the main body, the circuitry of the main body is configured to obtain characteristics of the wireless earbud and send the characteristics to the at least one processor,
wherein, while the wireless earbud is plugged in the connection hole of the main body, the at least one processor is configured to execute computer program instructions stored in the at least one memory to initiate charging of a battery of the wireless earbud, wherein the wireless earbud and the smartphone are configured to establish wirelessly pairing for wireless data communication therebetween, wherein the mobile apparatus is configured to generate sound when the at least one mobile application is searching for the mobile apparatus while the wireless earbud and the smartphone are paired, wherein, in response to pressing of the user input button on the main body, the at least one processor is configured to execute computer program instructions stored in the at least one memory to initiate processing for the wireless pairing, wherein, when the wireless earbud is plugged into the connection hole of the main body, the system is configured such that the smartphone wirelessly communicates with at least one of the main body and the wireless earbud.

31. The system of claim 30, wherein, in response to unplugging the wireless earbud out of the connection hole, the system is configured to initiate processing for the wireless pairing with the smartphone, wherein, in response to plugging the wireless earbud into the connection hole, the at least one processor is configured to execute computer program instructions stored in the at least one memory to initiate ceasing of the wireless pairing with the smartphone.

32. The system of claim 30, wherein the system is configured to such that, in response to plugging into the connection hole of the main body, the wireless earbud stops playing sound based on audio data from the smartphone, wherein the system is configured to provide a battery status to the smartphone such that a low battery warning is displayed on the smartphone, wherein the wireless earbud is configured to initiate the wireless pairing in response to unplugging out of the connection hole of the main body, wherein the system is configured such that, subsequent to unplugging out of the connection hole of the main body, the wireless earbud generates sound using audio data from the smartphone without an additional action of a user to the wireless earbud.

33. The system of claim 30, wherein the main body further comprises a communication module configured to interface data communication with the wireless earbud, wherein the main body is a wearable device.

34. A system comprising:
a mobile base station comprising a connection hole, a user input button, at least one processor, at least one memory, and circuitry; and
a wireless earbud capable of wireless pairing with a smartphone and configured for plugging into the connection hole of the mobile base station to form an integrated body with the mobile base station,
wherein, in response to pressing of the user input button of the mobile base station, the at least one processor is configured to execute computer program instructions stored in the at least one memory to initiate processing for the wireless pairing with the smartphone, wherein, while the wireless earbud is plugged in the connection hole of the mobile base station, the wireless earbud is configured to electrically connect with the circuitry of the mobile base station and further configured to perform wired data communication with the mobile base station, wherein, while the wireless earbud is plugged in the connection hole of the mobile base station, the mobile base station is configured to initiate charging of a battery of the wireless earbud, wherein while the wireless earbud is wirelessly paired with the smartphone, the wireless earbud is configured to perform data communication with the smartphone, wherein the system is configured to generate sound when a mobile application installed on the smartphone is searching for the system while the wireless earbud is paired with the smartphone.

35. The system of claim 34, wherein, in response to unplugging the wireless earbud out of the connection hole, the system is configured to initiate processing for the wireless pairing with the smartphone, wherein the at least one processor is configured to determine whether the wireless earbud is plugged into the connection hole or unplugged out of the connection hole of the mobile base station.

36. The system of claim 34, wherein, in response to plugging the wireless earbud into the connection hole of the mobile base station, the circuitry of the mobile base station is configured to obtain characteristics of the wireless earbud and send the characteristics to the at least one processor, wherein, when the wireless earbud is plugged into the connection hole, the system is configured such that the smartphone wirelessly communicates with at least one of the mobile base station and the wireless earbud.

37. The system of claim 34, wherein, in response to plugging the wireless earbud into the connection hole, the at least one processor is configured to execute computer program instructions stored in the at least one memory to initiate ceasing of the wireless pairing with the smartphone, wherein, when the wireless earbud is plugged into the connection hole, the smartphone is configured to wirelessly communicate with at least one of the mobile base station and the wireless earbud.

38. The system of claim 34, wherein the system is configured such that, subsequent to unplugging the wireless earbud out of the connection hole of the mobile base station, the wireless earbud generates sound using audio data from the smartphone without a user input to the wireless earbud.

* * * * *

UNITED STATES PATENT AND TRADEMARK OFFICE
CERTIFICATE OF CORRECTION

Page 1 of 1

PATENT NO. : 10,455,066 B2
APPLICATION NO. : 15/563937
DATED : October 22, 2019
INVENTOR(S) : Seung Jin Kim It is certified that error appears in the above-identified patent and that said Letters Patent is hereby corrected as shown below:

In the Specification

Column 8, Line 27, "112" should read --112)--

Column 20, Line 44, "device" should read --device.--

Column 23, Line 57, "102" should read --102.--

Signed and Sealed this
Twenty-fifth Day of February, 2020

Andrei Iancu
*Director of the United States Patent and Trademark Office*